United States Patent [19]

Tuckner

[11] Patent Number: 5,628,030
[45] Date of Patent: May 6, 1997

[54] VIRTUAL MODEM DRIVER APPARATUS AND METHOD

[75] Inventor: Steven A. Tuckner, Minneapolis, Minn.

[73] Assignee: Multi-Tech Systems, Inc., Moundsview, Minn.

[21] Appl. No.: 597,682

[22] Filed: Feb. 6, 1996

Related U.S. Application Data

[63] Continuation of Ser. No. 217,797, Mar. 24, 1994, abandoned.

[51] Int. Cl.⁶ .......................... G06F 13/14; G06F 9/455; H04M 11/00
[52] U.S. Cl. .......................... 395/884; 395/500; 379/93; 364/DIG. 1
[58] Field of Search .......................... 395/200.09, 840, 395/860, 866, 872, 884, 650, 500, 700, 727; 370/32; 375/222; 379/93

[56] References Cited

U.S. PATENT DOCUMENTS

| | | | |
|---|---|---|---|
| 4,040,014 | 8/1977 | Gehrking | 340/825.5 |
| 4,045,774 | 8/1977 | Morrison | 340/825.5 |
| 4,425,625 | 1/1984 | Seligman et al. | 379/98 |
| 4,503,288 | 3/1985 | Kessler | 379/67 |
| 4,797,878 | 1/1989 | Armstrong | 370/95.2 |
| 4,989,203 | 1/1991 | Phinney | 370/85.13 |
| 5,155,847 | 10/1992 | Kirouac et al. | 395/200.09 |
| 5,355,365 | 10/1994 | Bhat et al. | 370/85.13 |
| 5,369,700 | 11/1994 | Koura et al. | 379/387 |
| 5,408,527 | 4/1995 | Tsutsu | 379/211 |
| 5,452,329 | 9/1995 | Sato | 375/222 |
| 5,524,047 | 6/1996 | Brown et al. | 379/93 |

*Primary Examiner*—Parshotam S. Lall
*Assistant Examiner*—Viet Vu
*Attorney, Agent, or Firm*—Merchant, Gould Smith, Edell Welter & Schmidt

[57] ABSTRACT

The present invention provides for a virtual modem device for connecting to a plurality of active communication applications in an environment wherein communication applications utilize a communications driver when talking to an actual modem attached to the system. The virtual modem device selectively connects the communication applications to an actual modem, handles and connects incoming calls to the appropriate communication application, and provides for direct connection capability. The invention utilizes a software communications driver and a master communications application to control the driver connectivity to fool each communication application that it is connected to the actual modem. The virtual modem is implemented by creating a communications driver in software that emulates a modem in idle mode (e.g., when it is not off-hook and in command mode) and is utilized for each communication application that is connected to a communication port designated as a virtual modem.

34 Claims, 15 Drawing Sheets

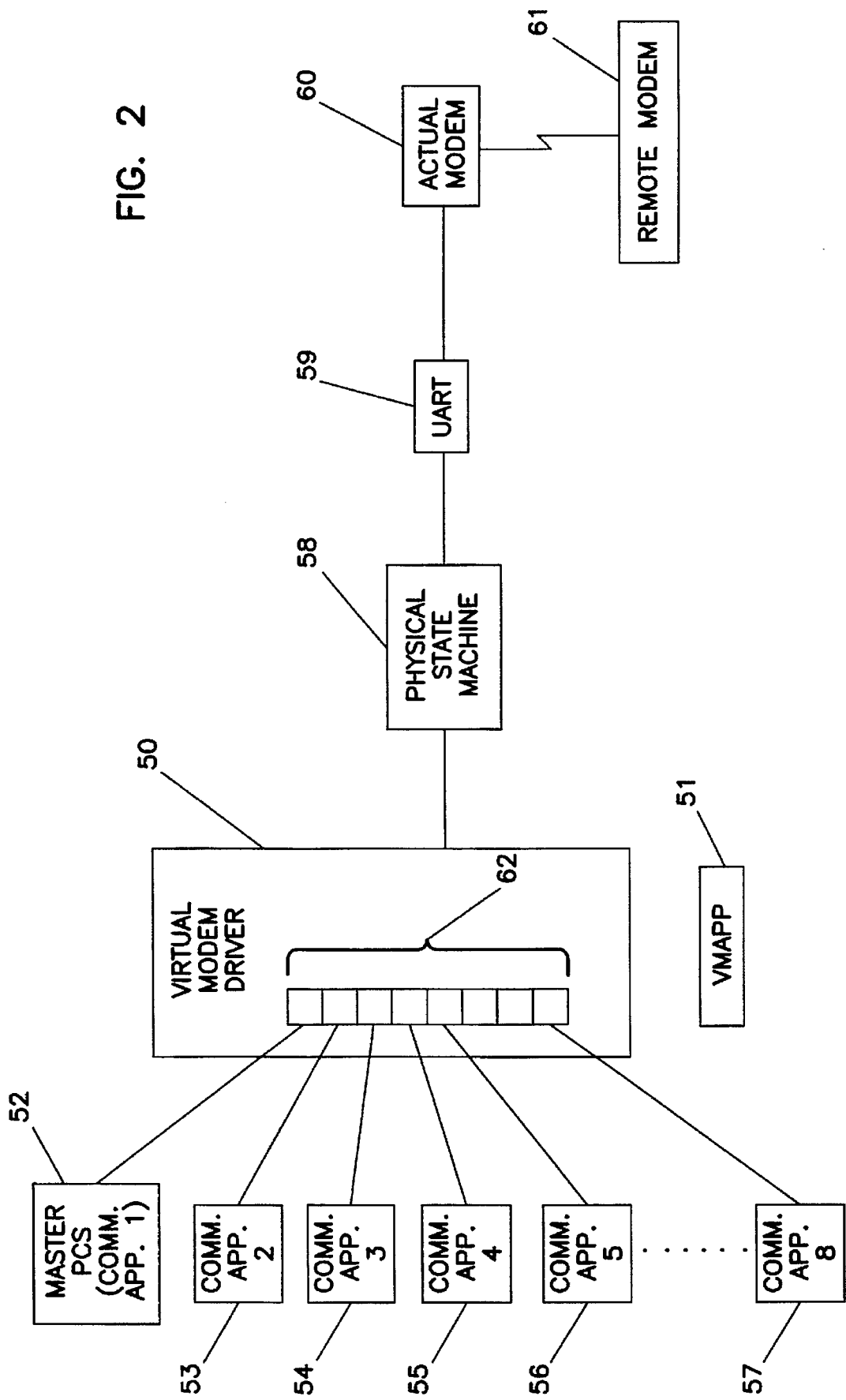

| A | Process Command Line |
| B | Attempt to Lock the Port |
| C | Send 'BUSY' response to app |
| D | Send 'NO CARRIER' response to app |
| E | route received chars to accept command state machine |
| F | Tell virtual modem state machine that command is entered |
| G | Buffer chars to be processed on getting carriage return |
| H | Echo characters if E parameter is not set to zero |

602

VIRTUAL MODEM DRIVER APPARATUS AND METHOD

This is a continuation of application Ser. No. 08/217,797, filed Mar. 24, 1994, now abandoned.

FIELD OF THE INVENTION

The present invention relates generally to computers and communications, more particularly to a communications driver which provides for a plurality of communication packages to be open simultaneously, and still more particularly to a software communications driver acting as a virtual modem in an environment wherein communication applications utilize a communications driver when talking to an actual modem attached to the system and wherein a plurality of the communications applications may be active at one time and the communications driver intelligently connects the appropriate application to the actual modem.

BACKGROUND OF THE INVENTION

Currently in a Windows type environment, a user is limited to having only one communication application active. This limitation stems from the communication driver which can only connect one communication application to the communication port at any given time. Accordingly, when trying to activate more than one communication application, the communications port is busy and the communications application will not open properly. Therefore, communication applications must be repeatedly closed and launched as the various packages are utilized, rather than remaining active as an icon (as those terms are understood in the computer industry).

This limitation associated with the communication driver also presents drawbacks when waiting for incoming calls. Since only one communication application can utilize the communications port at any given time, in the past it has been virtually impossible for various communications applications (e.g., dealing with voice, fax, and data) to receive incoming calls and have the call routed to the appropriate application. Some "same vendor" applications do have some capability in this regard. However, this requires that each application be purchased from the same vendor, regardless of the needs, familiarity, and desires of the user. It will be appreciated that in many instances, the user may be more productive having several different vendor application packages (and/or same vendor application packages which do not provide sharing of the communications port).

Additionally, when utilizing direct connections to the modem to run conferencing type programs, again only one application is allowed to use the port so that the autodialing or other application must give up the port prior to launching the conferencing type program.

Therefore, there arises a need for a virtual modem driver which is capable of interfacing with a plurality of communications applications, direct incoming calls to the proper voice, fax, and data communications applications, and provide a direct connect to the modem when utilizing certain conferencing type communications applications. The present invention directly addresses and overcomes the shortcomings of the prior art.

SUMMARY OF THE INVENTION

The present invention provides for a virtual modem device for connecting to a plurality of active communication applications in an environment wherein communication applications utilize a communications driver when talking to an actual modem attached to the system. Such environments can include graphical user interface applications such as provided by the windows software program manufactured by Microsoft Corporation and in a Macintosh software environment manufactured by Apple Corporation, among others. For convenience, these environments will be referred to herein as a windows type environment, however, this designation should not be construed in a limiting manner. The present invention operates in these windows type environments to selectively connect the communication applications to an actual modem. The present invention also provides for handling incoming calls and connecting incoming calls to the appropriate communication application. Still further, the present invention provides for direct connection capability. The invention utilizes a software communications driver and a master communications application to control the driver connectivity. In essence the invention emulates an actual, physical modem in order to "fool" or "convince" each communication application that it is connected to the actual modem. In this manner, each of the communication applications operates in its intended manner since it cannot tell that it does not have an actual modem to itself. In fact, however, each application shares the same actual modem. Thus, each application is described herein as "communicating" or "talking" to a virtual modem.

In a preferred embodiment constructed according to the principles of the present invention, a virtual modem is implemented by creating a communications driver in software that emulates a modem in idle mode (e.g., when it is not off-hook and in command mode). Preferably this emulation s utilized for each communication application ("COMMAPP") that is connected to a communication port ("COMMPORT") designated as a virtual modem. It will be appreciated that some COMMPORTs may be mapped directly to actual COMMPORT hardware and some may be designated as virtual modems. Thus, when a COMMAPP issues an "AT" command to the port, the virtual modem software driver responds with an appropriate modem response (e.g., "OK"). The driver performs a full emulation of an actual modem in command mode and thus allows the setting and querying of modem register settings. In this manner, applications talk to the actual modem only after they have issued a dial or answer "AT" command and have obtained a lock on the actual modem. If the actual modem is already locked by another COMMAPP, then this application is given an appropriate "AT" response to indicate that the call attempt failed (e.g., "BUSY" response).

In the preferred embodiment, incoming calls on the actual modem are handled by a Master PCS application (hereafter referred to as "Master application") that talks directly to the actual modem—after obtaining a lock on the actual modem. Additionally, the Master application receives all data from the actual modem when it is not locked by another COMMAPP. If the Master application detects a ring (i.e., a "RING" message), then it locks the port, determines the type of call (e.g., Voice/Fax/Data), and directs the virtual modem software driver ("VMS driver") to send "RING" responses to the appropriate application (or alternatively it can process the call itself). After the application responds with an "ATA" or the ring counter expires (i.e., S0=2 and the VMD sends 2 RING responses), then the VMS driver initializes the actual modem according to how the application initialized the virtual modem, issues an ATA, and connects the application up to the actual modem. This process also occurs when a modem does an ATD to dial.

In the preferred embodiment, a port can also be a virtual direct connect (a direct connect being a direct serial line between two DTE's—computers). In this setting, the Master application locks the port, connects the local modem to a remote modem with a data connection, and signals the VMS driver to connect a COMMAPP. The connected communication application acts in a manner consistent with communicating to a direct connection (i.e., not to an actual modem, but to a serial line connected directly to another device) via the actual modem. Since the actual modem is already connected to a remote modem, the port acts just like a direct connect.

If the modem were to disconnect while the direct connect application were connected to the actual port, then the virtual direct connect would act just like a serial direct connect would act if the wire was cut (i.e., data would no longer pass to the remote side of the connection and the disconnect message from the modem would not be passed to the application—since it doesn't know that it is communicating through a modem).

One feature of the present invention is that it allows one or more Windows 3.1 COMMAPPs to dynamically share a modem connected to the user's PC. This allows a user to keep COMMAPPs active that are useful to maintain in that status.

Another feature of the present invention is that it allows incoming calls, whether they are voice/fax/data, to be routed to the appropriate communications application by the Master application.

Yet another feature is that the present invention provides for data communications applications in a direct connect mode to connect to a modem that is already connected and on-line. This allows an incoming data call to be routed to the appropriate data COMMAPP.

Therefore, according to one embodiment of the invention, there is provided a method of creating a virtual modem in a computer environment with an actual communication port connected to a single modem, comprising the steps of: (a) creating a driver for emulating a plurality of virtual communication modems in a computer memory location; (b) controlling the virtual modems in a manner to effectively connect only one of a plurality of communication applications to the actual modem at any given time; and (c) receiving and retransmitting to the actual modem initialization signals received at the plurality of virtual modems in order to establish proper transmission and receipt of information through the virtual modem to the actual modem.

According to another embodiment of the invention, there is provided an apparatus for automatically creating a virtual modem in a computer environment in which communications applications utilize a communications driver when talking to an actual modem connected to the computer, comprising: (a) memory means for storing a driver program for emulating a plurality of virtual modems; (b) first processor means for applying a set of predetermined rules to the driver for controlling the connection of the virtual modems to an actual modem; and (c) second processor means for receiving initialization information from the communication applications and transmitting the received initialization information to the actual modem, whereby the actual modem is properly initialized to establish communication.

These and other advantages and features which characterize the present invention are pointed out with particularity in the claims annexed hereto and forming a further part hereof. However, for a better understanding of the invention, its advantages and objects obtained by its use, reference should be made to the drawing which forms a further part hereof, and to the accompanying descriptive matter, in which there is illustrated and described a preferred embodiment of the present invention.

BRIEF DESCRIPTION OF THE DRAWING

In the drawing wherein like reference numerals and letters indicate corresponding elements throughout the several views (with the exception of the continuation designations in the logical flow diagrams and state charts, and the state action designation letters):

FIG. 2 is a functional block diagram illustrating the various functional software and hardware components of the present invention;

DETAILED DESCRIPTION

The principles of this invention apply to the creation of a virtual modem. The functionality of the virtual modem provides for monitoring incoming calls, connecting with one or more communication applications, and logically connecting the communication applications to an actual modem. The preferred application for this invention is in a windows type or other graphical user interface environment. Such application however, is typical of only one of the innumerable types of applications in which the principles of the present invention can be employed.

Therefore, it will be appreciated by those skilled in the art that while the example of use with the Windows graphical user interface is utilized herein, the principles of the present invention apply to the creation of a virtual modem which interacts with one or more communications packages and allocates the communications resource of the modem.

Figure 1:
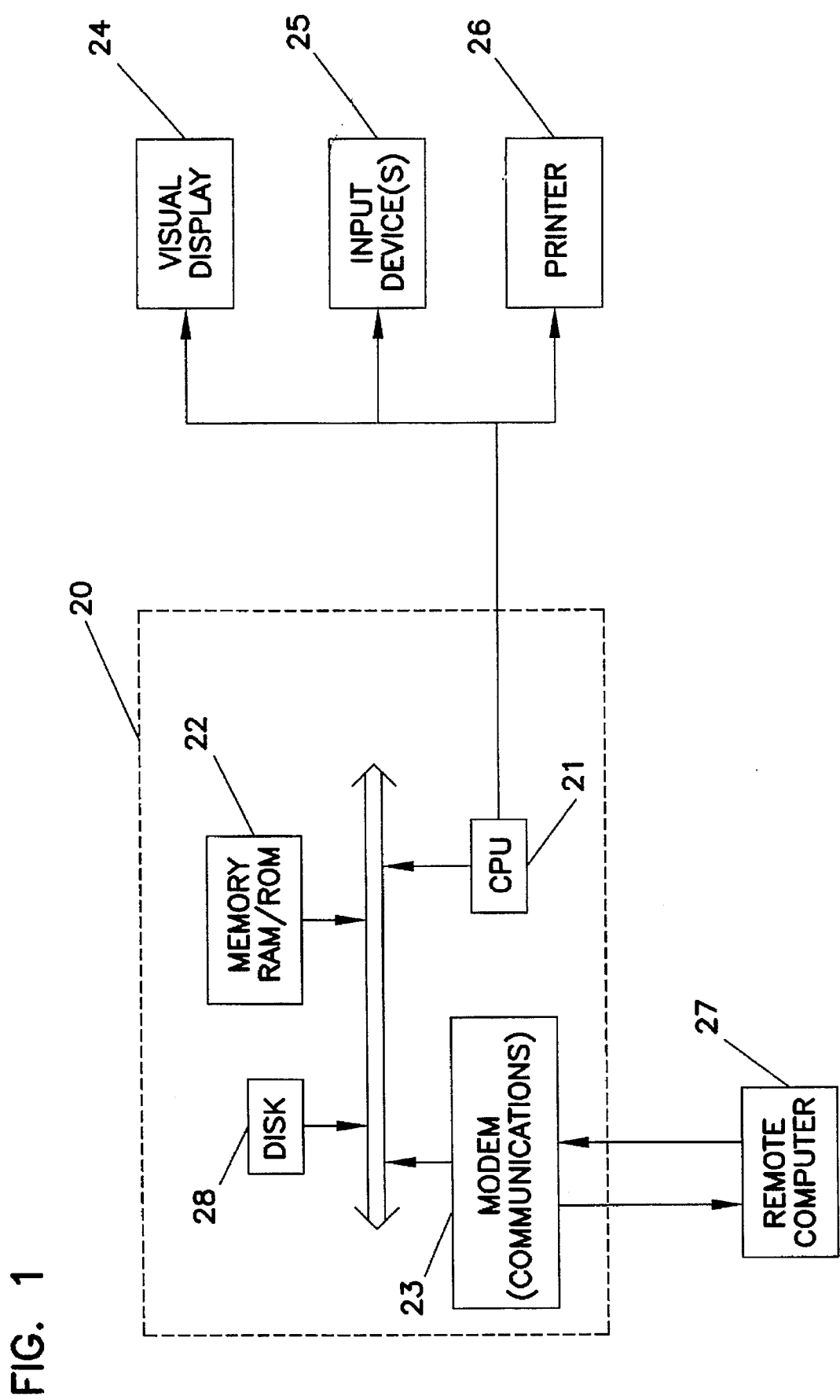
FIG. 1 is a block diagram illustrating an environment in which an apparatus and method constructed according to the principles of the present invention may be utilized.

Referring now to FIG. 1, there is illustrated a preferred system in which devices constructed in accordance with the principles of the present invention may be utilized. A multipurpose computer 20 for operating a software program which performs the operations of the virtual modem is illustrated in FIG. 1. Also illustrated in FIG. 1 are computer peripheral components designated as blocks 24, 25, and 26, as well as a remote computer 27. In the preferred embodiment, computer 20 is an IBM/DOS AT style computer, preferably with a 486 style chip. However, it will be appreciated that the computer 20 might also be other types of computers (e.g., Apple/Macintosh, unix based, etc.)

The computer 20 is illustrated in FIG. 1 as including a microprocessor 21, various memory devices 22 (e.g., RAM, ROM, EEPROM) and disk storage 25 (e.g., optical, floppy and hard disks, etc.) and a modem/communications block 23 for communicating with remote computers, etc. It will be appreciated that the modem/communications block 23 can be either an internal or external modem together with appropriate supporting circuits, chips and buffers which are well known in the art.

The computer 20 peripheral devices can include a printer 26, input device 25 (which can include a keyboard, a light pointing pen, a mouse, etc.), and a visual display 24 such as a monitor.

The remote computer 27 may be the source of the incoming information (e.g., voice, facsimile or other data) or may be the location to which such information is to be sent. The program logic for implementing the virtual modem may be stored in one or more of the memory devices block 22, be transmitted from remote computer 27, or may preferably be stored on disk storage devices 28.

Turning next to FIG. 2, in the preferred embodiment of the invention, a VMS driver is installed to run with the software program manufactured by Microsoft Corporation of Seattle, Wash. and sold under the designation WINDOWS 3.1. Several of the advantages of using the VMS driver in this environment are: (1) it allows multiple Windows 3.1 COMMAPPs to dynamically share a modem connected to the user's PC; (2) it allows incoming calls, whether they are voice/fax/data, to be routed to the appropriate communications application; and (3) it allows data communications applications in a direct connect mode to a modem that is already connected and on-line.

The first two advantages are fulfilled by interposing the VMS driver between the COMMPORT and the COMMAPPS. The VMS driver emulates an actual modem in a manner which makes it invisible to the COMMAPPS. Thus, the COMMAPPS are fooled into thinking that they all have an actual modem to themselves—when in fact they are all sharing the same modem.

The preferred embodiment of the present invention is implemented in three software programs: a virtual modem software communications driver 50 (VMS driver), a virtual modem application 51 (VMAPP), and a master communications application 52 (MASTER application). These programs are illustrated diagrammatically in FIG. 2 as blocks 50, 51, and 52 respectively. The actual communication protocols used between these applications are illustrated in Appendix 1 attached hereto and made a part hereof. The utilization of these protocols will be apparent to those skilled in the art upon a review of the drawing and the following detailed specification.

Also shown in FIG. 2 are various communication applications 53–57, a physical state machine block 58, UART block 59, modem block 60, and remote modem 61 which is attached to remote computer 27 (best seen in FIG. 1).

The VMS driver block 50 is implemented by modifying the source code for the standard Windows 3.1 communications driver. All routines that correspond to calls in the standard Windows 3.1 communications API are modified so that the data does not go out to the serial controller hardware (such as a 16550). Instead, the data goes to a virtual modem port. Any data the VMS driver receives from the COMMAPP (via standard communications driver calls to write data to a port) is interpreted as an actual modem in command mode would interpret them. Similarly, it sends data back to the COMMAPP—such as echoed characters or command responses—as necessary. Preferably, this is accomplished by putting the data into the COMMPORT's receive queue which is picked up by the COMMAPP calling the standard communication driver read data calls.

Figure 3A:
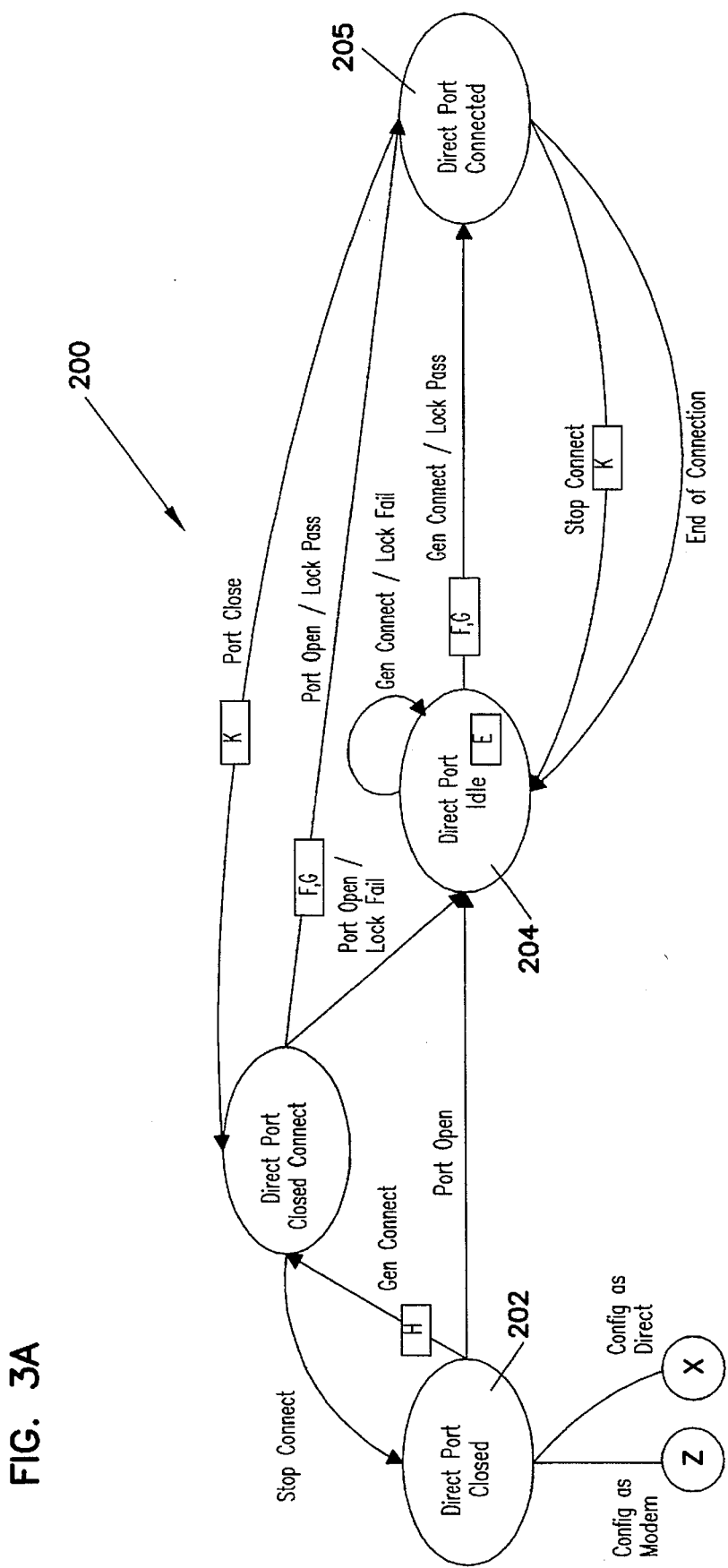
FIG. 3A-3C comprise a logical port state diagram.
Figure 3B:
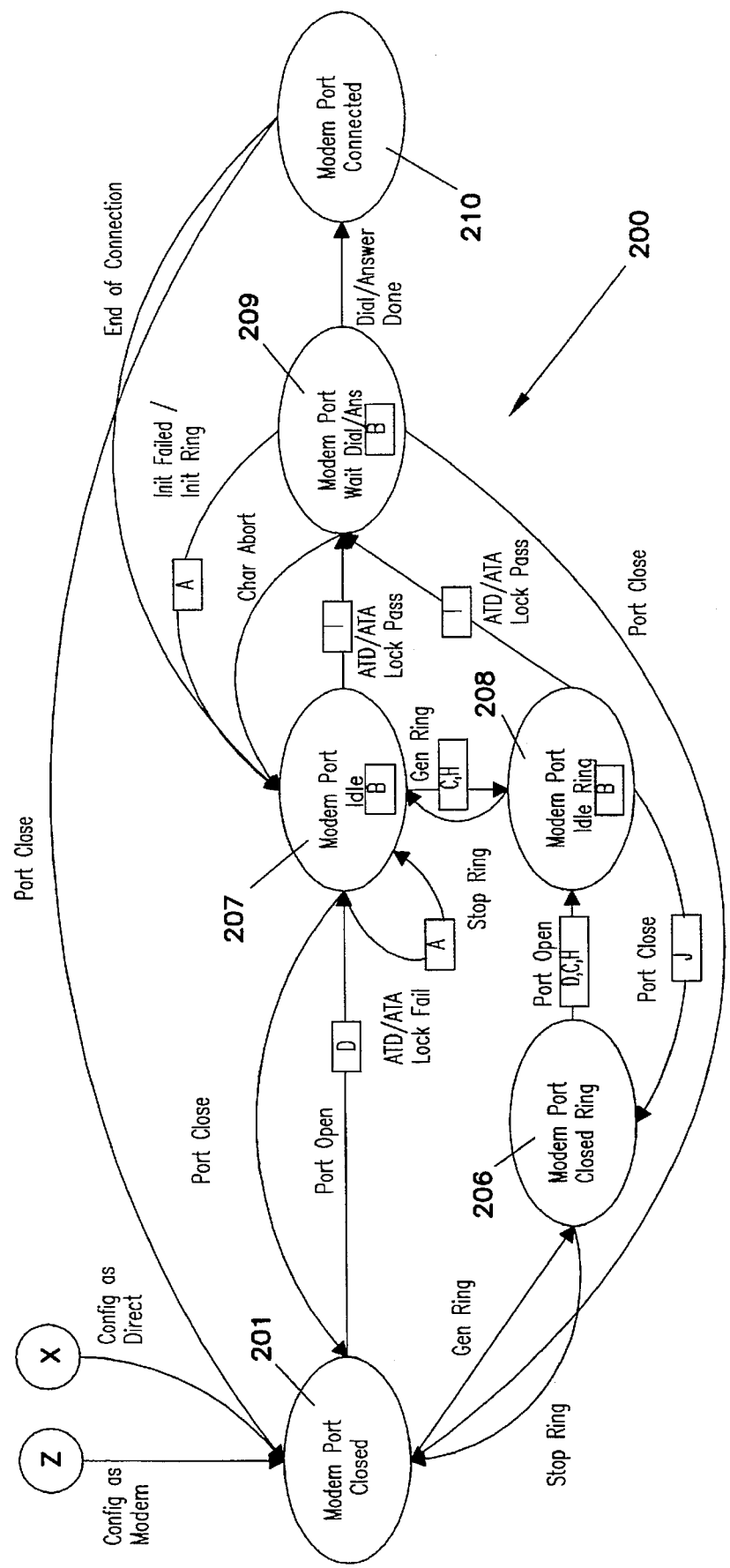
Figure 3C:
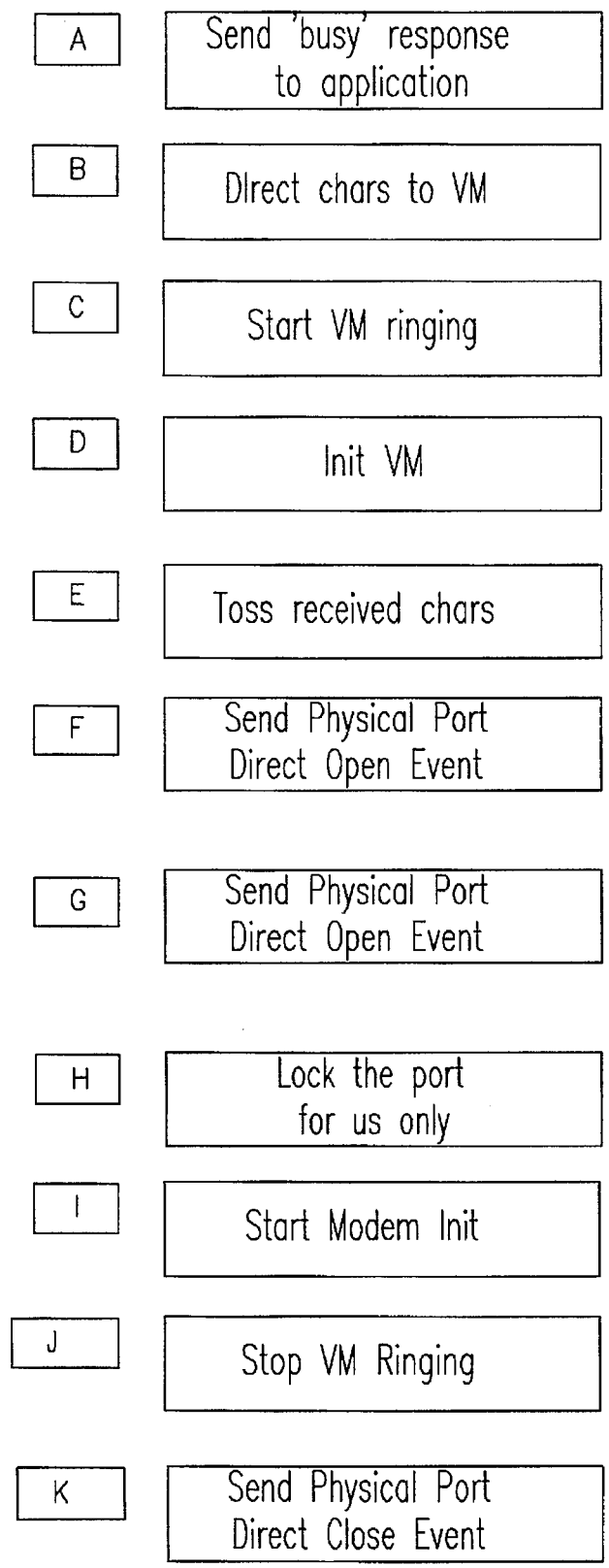
Figure 4A:
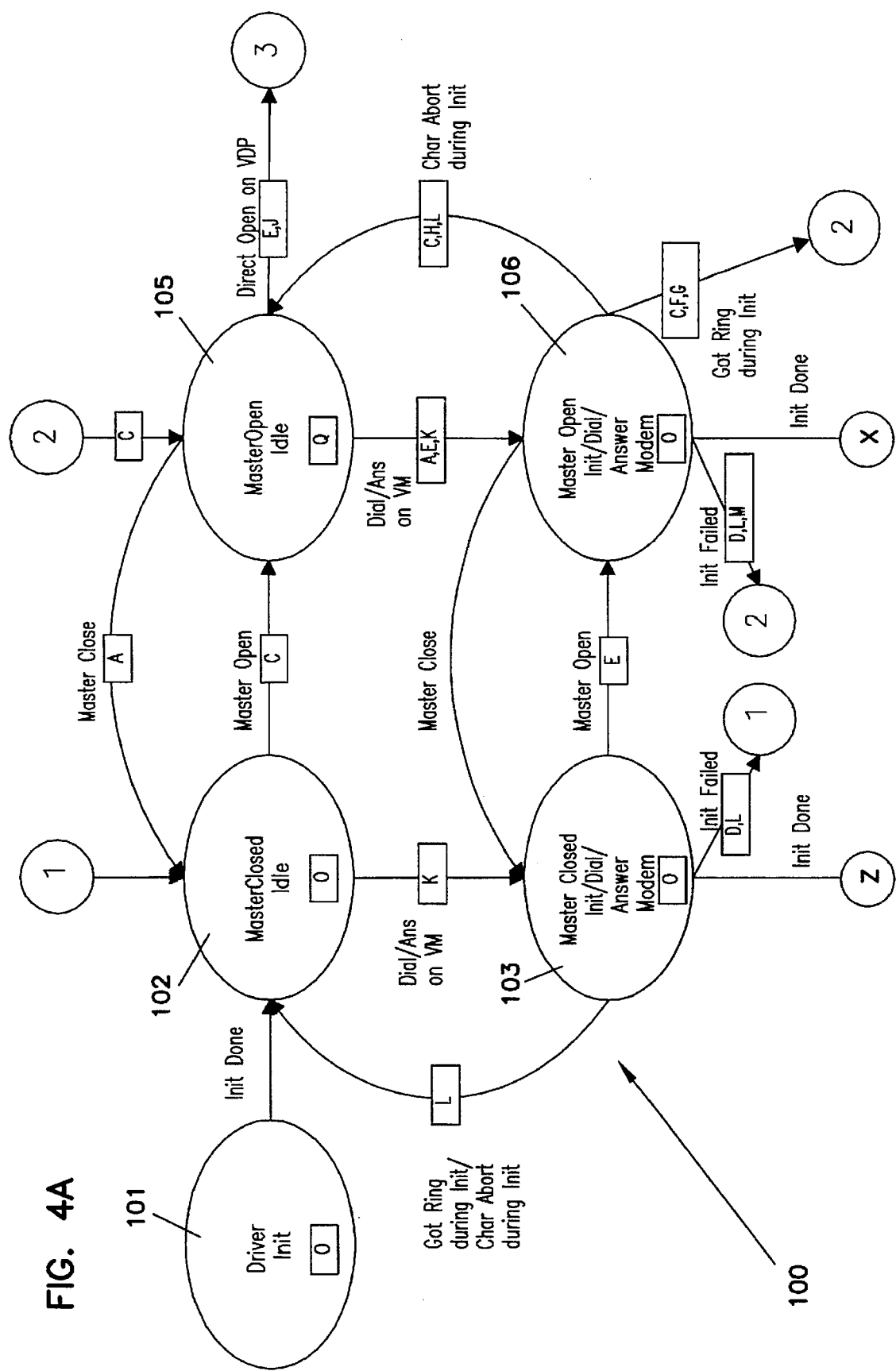
FIG. 4A-4D comprise a physical port state diagram.
Figure 4B:
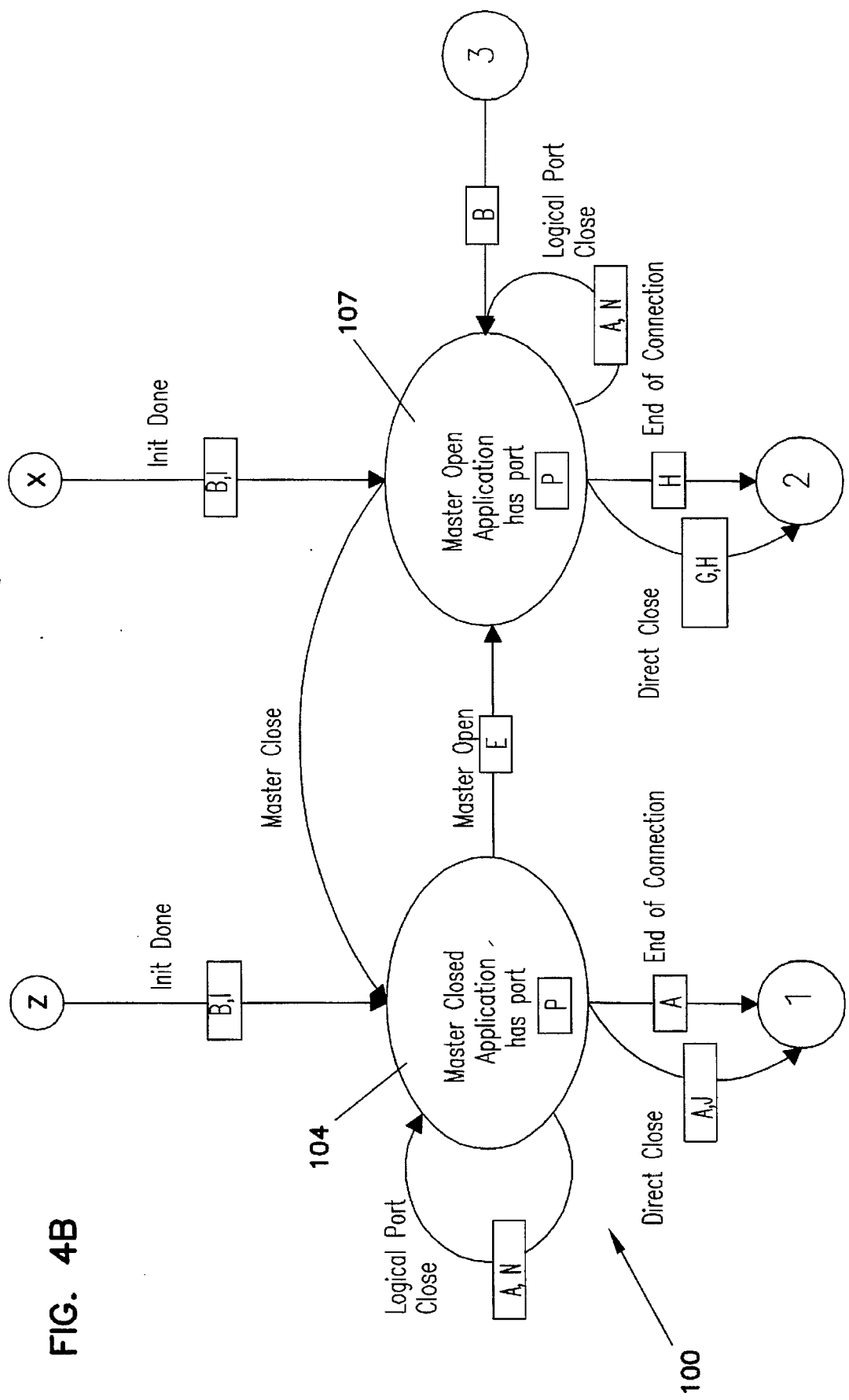
Figure 4C:
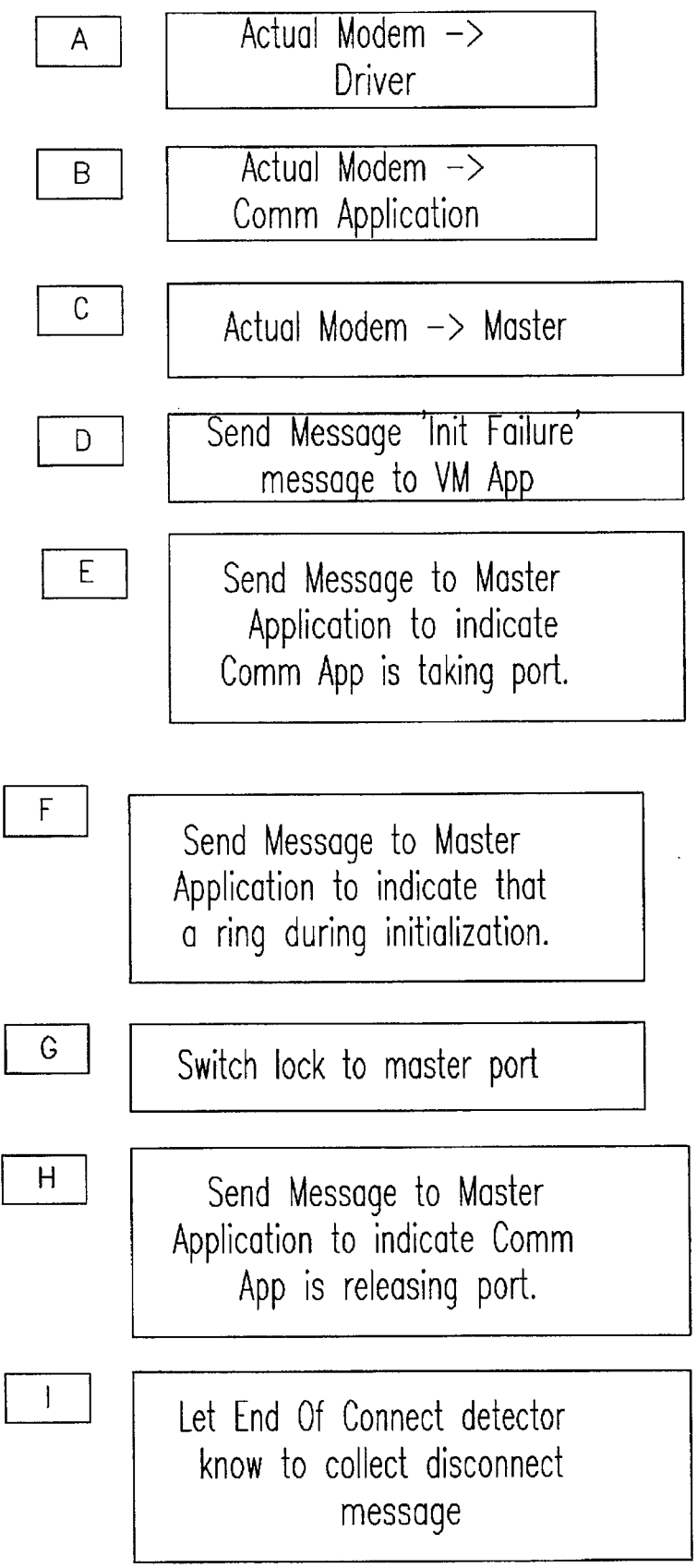
Figure 4D:
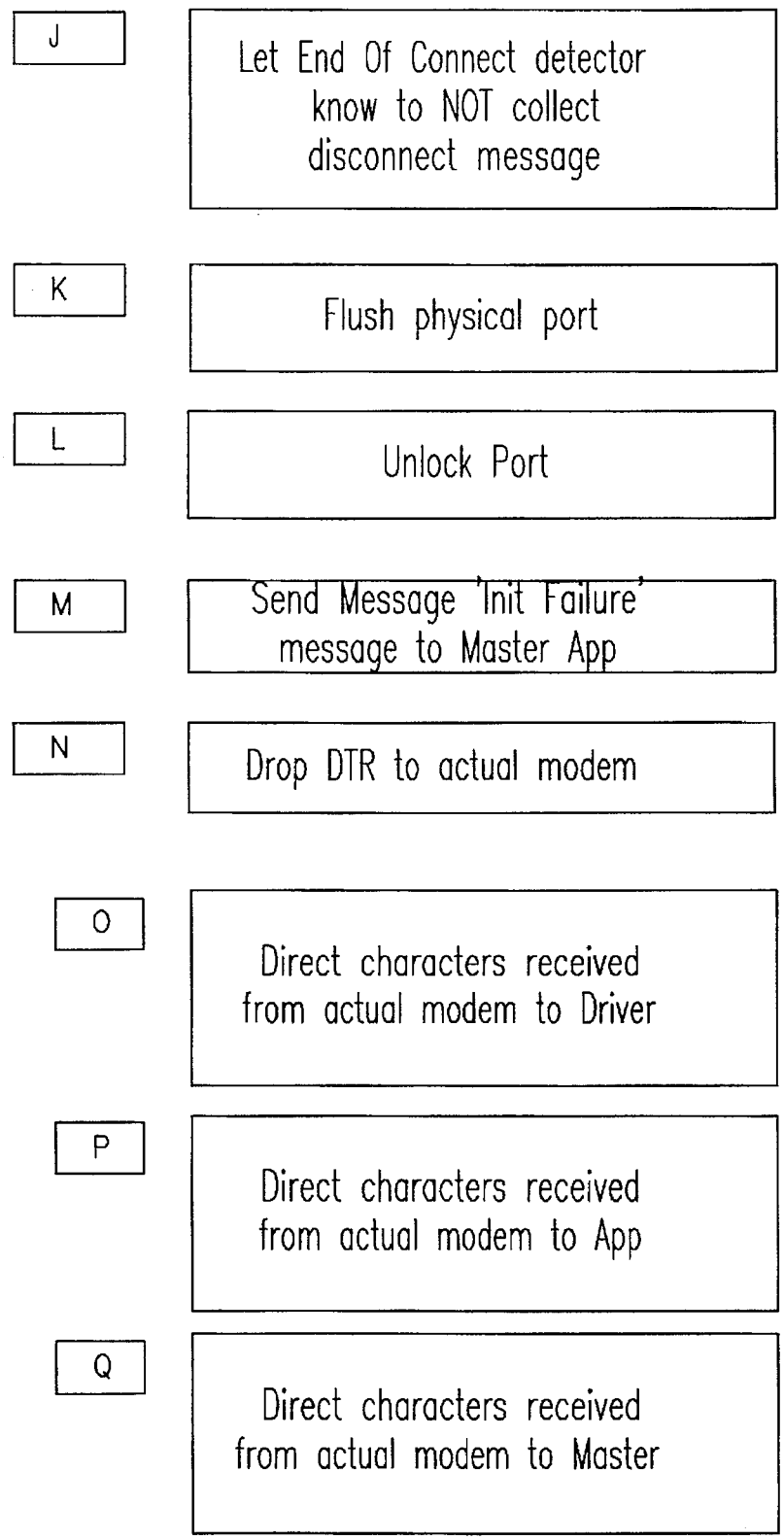

For each port that has a COMMAPP talking to a virtual modem (designated as blocks 62), the VMS driver keeps state variables indicating the state of each virtual modem. This includes the values of all the built in modem registers (e.g., s0, E, V, Q, etc) and whether the modem is dialing, or ringing or connected to the actual modem. The values of modem registers are kept in a separate data structure for each virtual modem and whether the modem is dialing, ringing, or connected is kept track of in a state machine. The state machine is detailed in FIGS. 3A–3C (designated generally at 200) and is discussed in detail below in connection with the various working examples.

The VMS driver block 50 also keeps state variables for the state of the actual modem 60 itself. These state machines keep track of which application is actually connected to the COMMPORT and which application has priority to lock the port for its own use at any given moment. This state machine is detailed in FIGS. 4A–4D (designated generally at 100) and is discussed in detail below in connection with the various working examples.

The VMAPP block 51 is necessary to start and kill timers for the driver, as the driver cannot make these calls to Windows directly. It also calls the VMS driver block 50 on a periodic basis (preferably on the order of every 100 milliseconds) to allow it to perform periodic tasks.

First, VMAPP block 51 directs received data from the physical port to the physical port state machine block 58 so that it can initialize the modem 60. Additionally, the VMAPP block 51 detects the end of connection when a COMMAPP (e.g., blocks 52–57) is connected to the actual modem 60. It will be appreciated by those skilled in the art that the information is provided on an interrupt basis and is queued for action in the order in which it is received.

The VMAPP block 51 also acts as a status/control application for the user so that the state of the VMS driver block 50 can be viewed. Examples of the information which can be viewed includes, which COMMAPP block 52–57 has the port locked, what ports are configured as virtual modems, etc. The VMAPP block 51 also modifies which ports are designated as virtual modems. The VMAPP must be loaded upon start-up for the VMS driver to work as specified.

The Master application block 52 has (at minimum) the responsibility to answer incoming calls, determine what type of call they are and pass them to the appropriate COMMAPP. It communicates with the driver by a set of API calls and messages that the VMS driver block 50 sends back to it. The MasterAPP can also preferably monitor which COMMAPP has the port at any given time and has the ability to lock others out of the port so that it can use the actual modem exclusively. This latter feature is necessary for determining the type of incoming calls, but also can be used for performing regular modem functions such as dialing and connecting.

When the Master application starts running it normally opens the port to which the modem 60 is attached. It then performs a vmd_MasterOpen call to establish the link between the Master application and the VMS driver. After completion, the Master application receive messages which are WM_COMMNOTIFY messages with the wParam parameter having a value of 100 or greater. These messages tell the Master application which ports (and thus which applications) are grabbing and then releasing the actual modem 60.

Handling incoming calls is the most important responsibility of the Master application. An example of the call handling functionality of the Master application will next be described.

First, either the Master application receives a InitRing message from the VMS driver block 50 (which indicates that a ring was detected when an application tried to call out) or the Master application receives a ring message from the actual modem 60. Second, if the Master application received a ring message from the actual modem 60, then it attempts to lock the actual modem 60.

Second, if the Master application fails to lock the actual modem 60, it proceeds back to the first ring. In this instance, an InitRing message will probably soon follow as the ring will be detected when the VMS driver tries to initialize the actual modem 60 to dial out. If it succeeds, then it proceeds to the next step.

Third, commands are transmitted to the modem 60 to determine the type of call.

Fourth, if it is a fax call, then a vmd_GenerateRing is performed to the virtual port that has the fax communication application attached to it. As noted above, the Master application tracks this configuration information for all of the virtual ports.

Fifth, when the application responds to the RING by issuing an ATA or doing an implied answers after getting "n" rings where S0=n, then the. Master application will receive a GrabPort message to indicate that the application has locked the port.

Sixth, after the call disconnects, then the Master application receives a ReleasePort message.

Figure 6A:
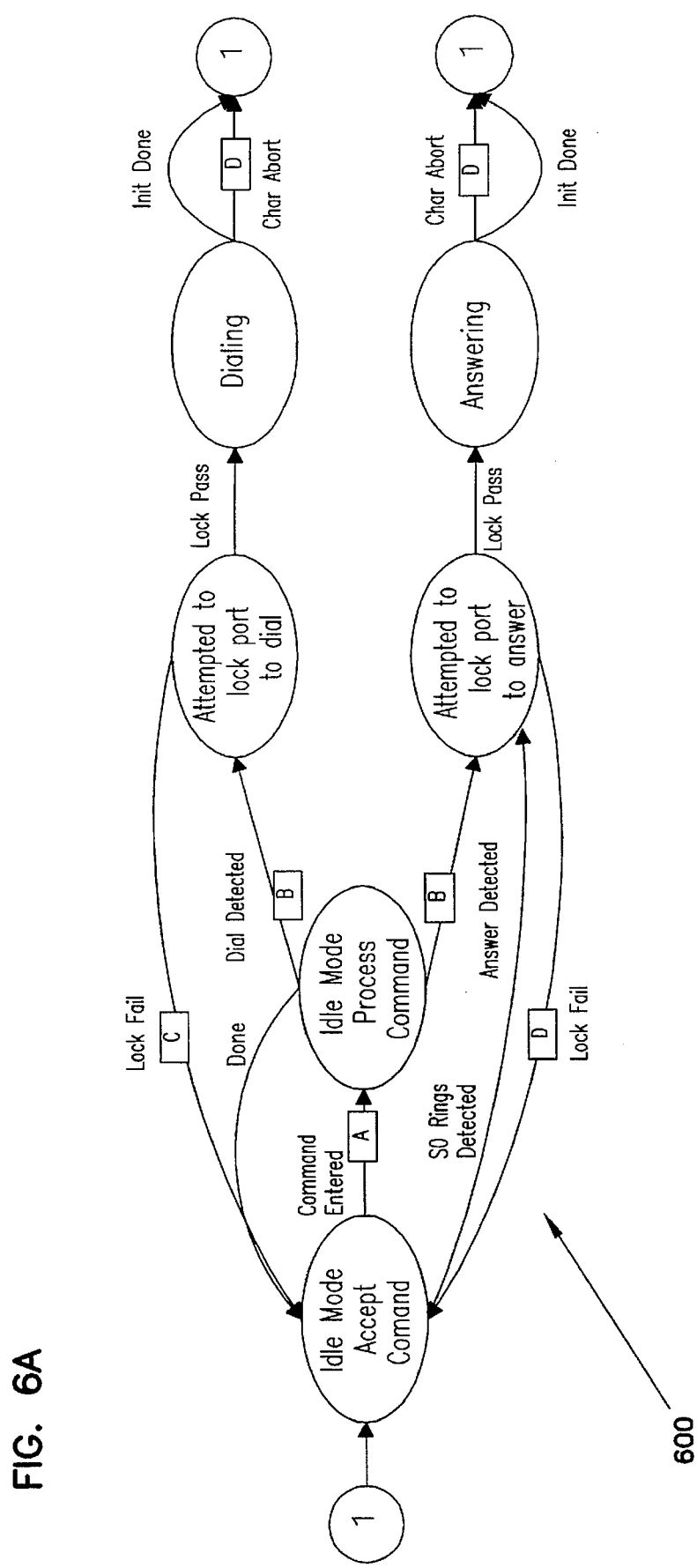
FIG. 6a is a virtual modem state machine diagram designated generally at 600.

Emulating a modem in the VMS driver block 50 is accomplished by taking input in the form of characters sent to the COMMPORT that is designated as a virtual modem and sending back to the application responses that mimic what an actual modem would send if it were connected to the port. The allowed states for the modem are indicated in the Virtual Modem State Machine Diagram set forth as FIG. 6a and designated generally at 600.

Figure 6B:
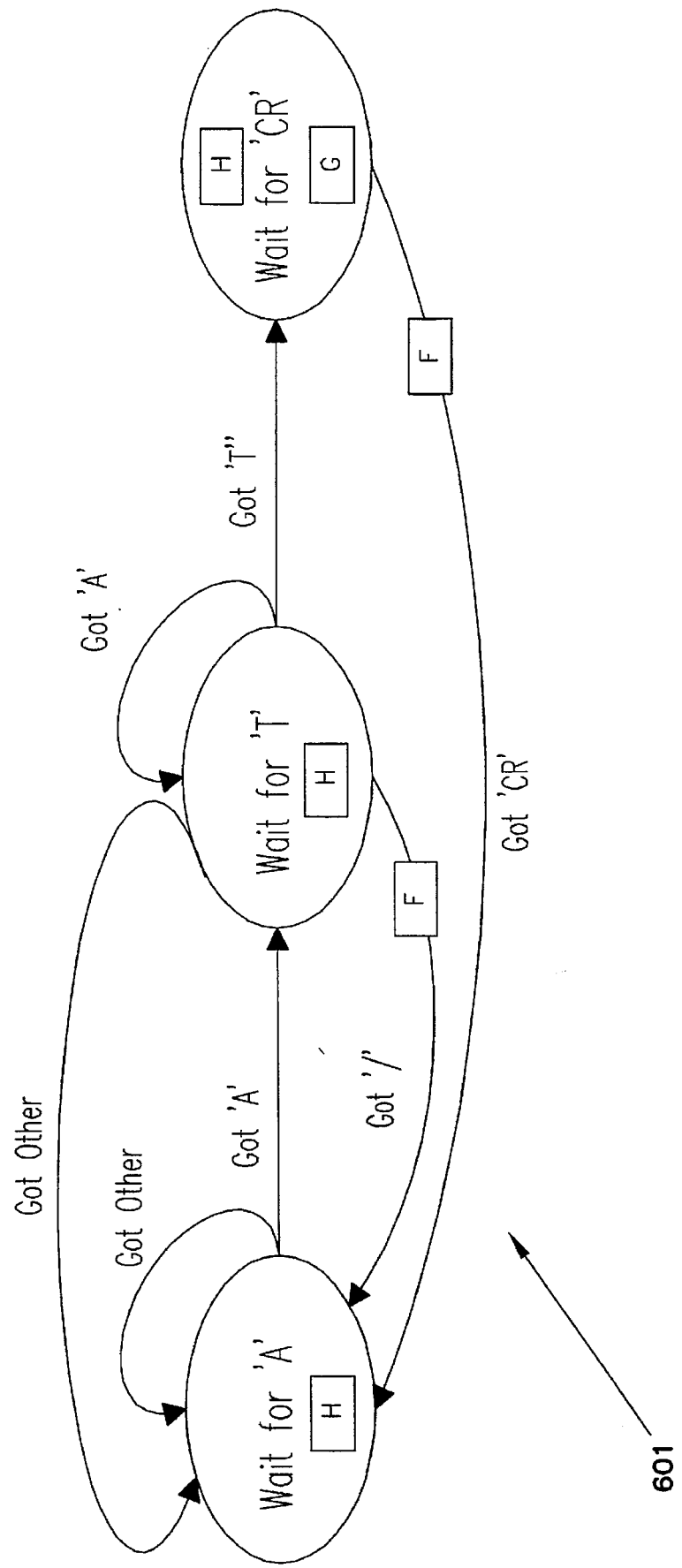
FIG. 6b is an accepts commands state machine diagram designated generally at 601.
Figure 6C:
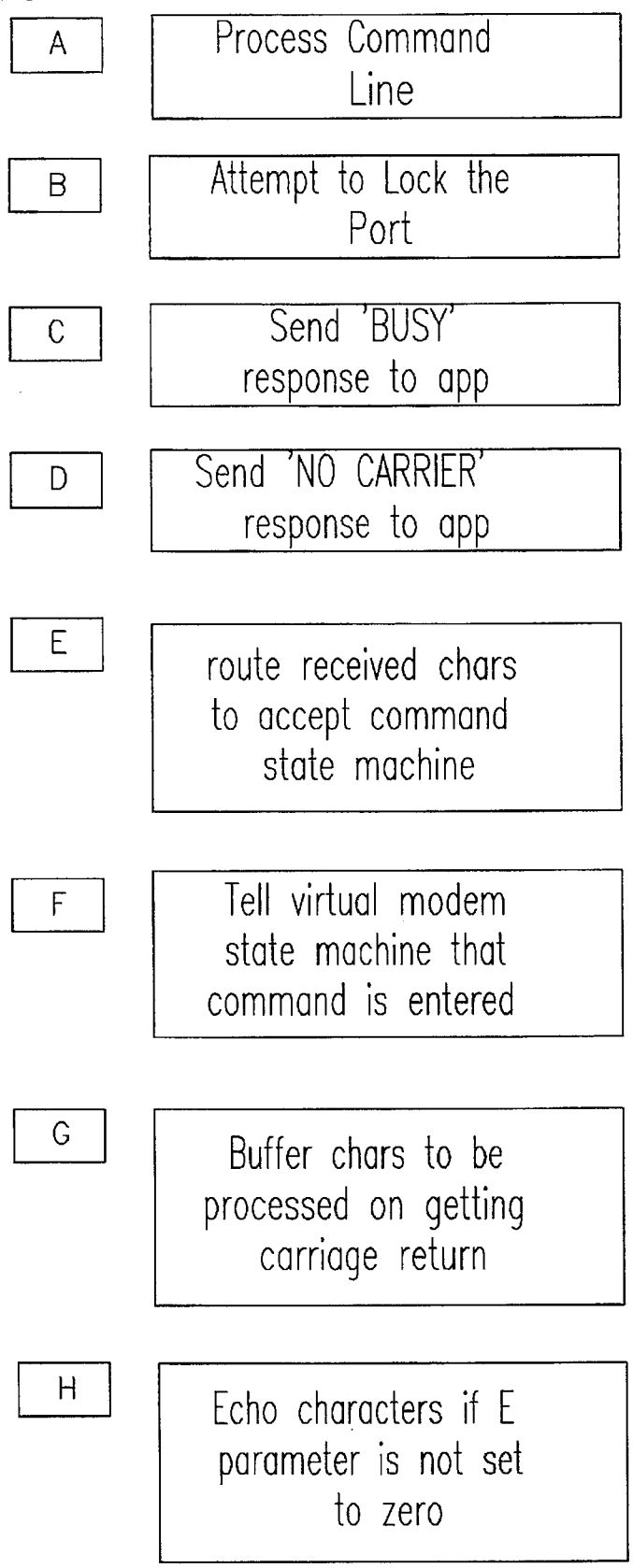
FIG. 6c, is an identification of the actions taken when moving between the various states illustrated in FIGS. 6a and 6b designated generally at 602.

The virtual modem initially starts out in an input mode accept command state when the port is opened. It then accepts AT commands in accordance with the Accept Commands State Machine diagram set forth as FIG. 6b and designated generally at 601. FIG. 6c details the functions (designated generally at 602) performed at and between the various states set forth in FIGS. 6a and 6b.

Figure 5A:
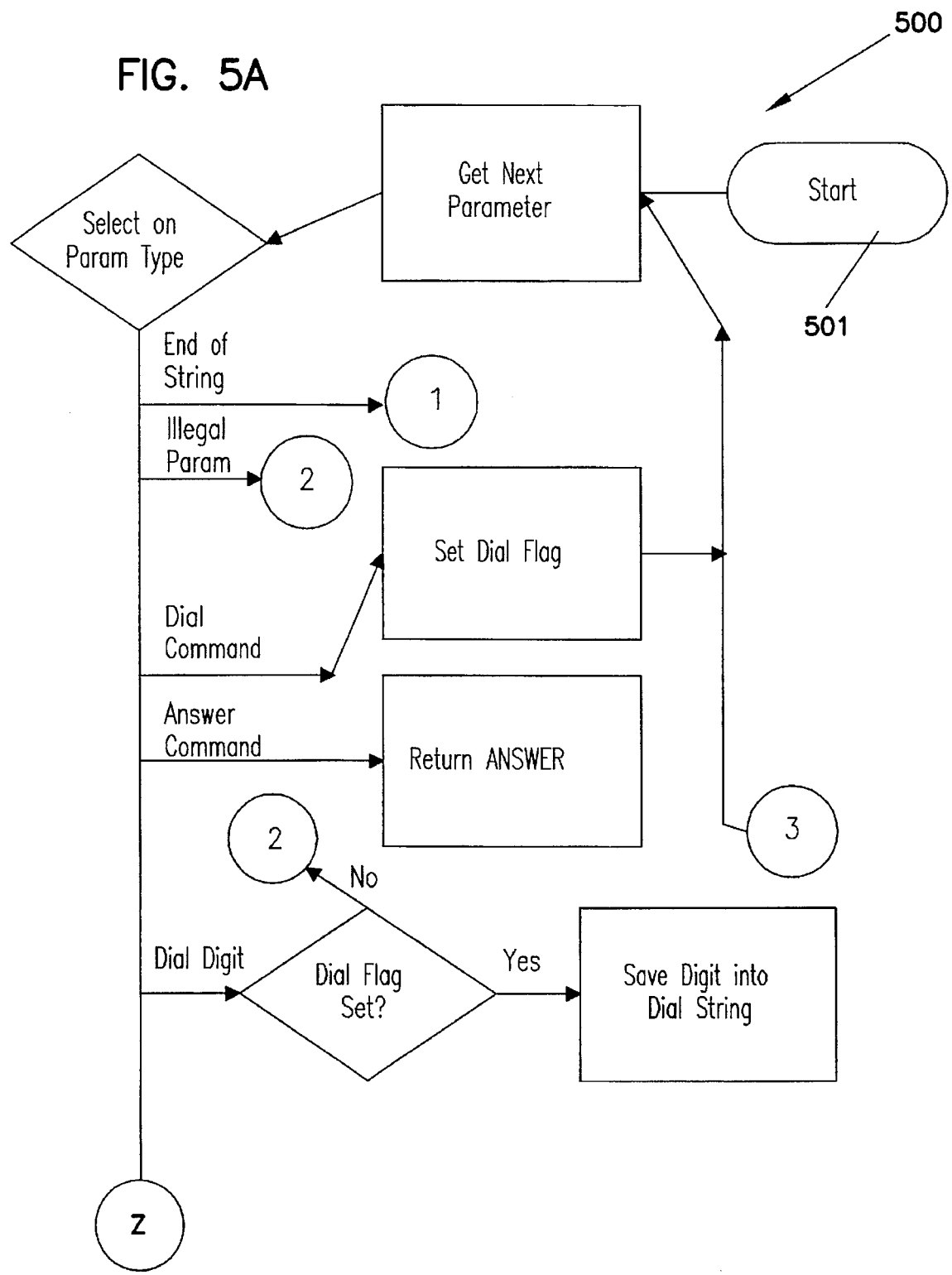
FIG. 5A-5C comprise a logic block diagram illustrating computer program operation of the present invention to emulate a modem.
Figure 5B:
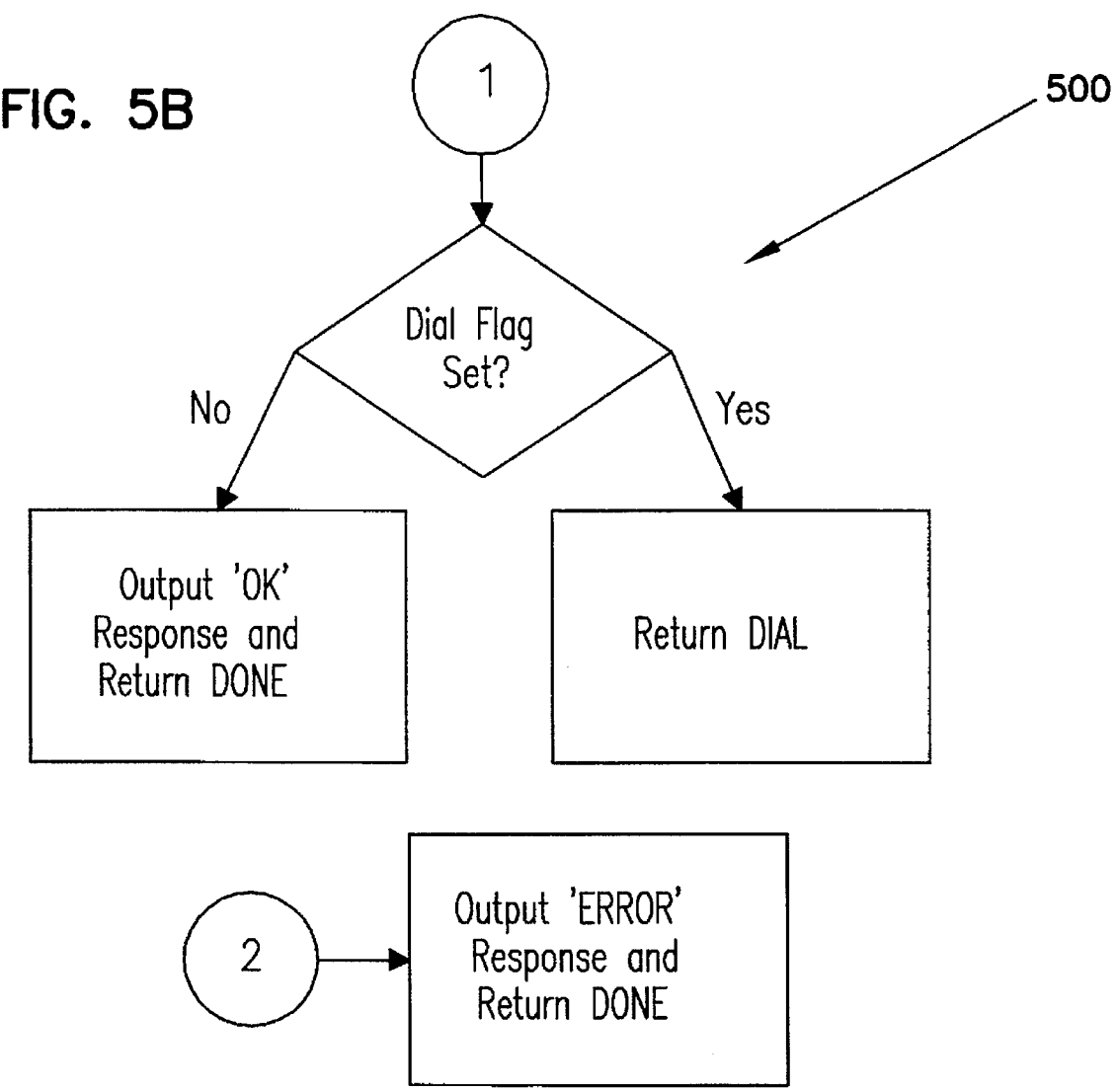
Figure 5C:
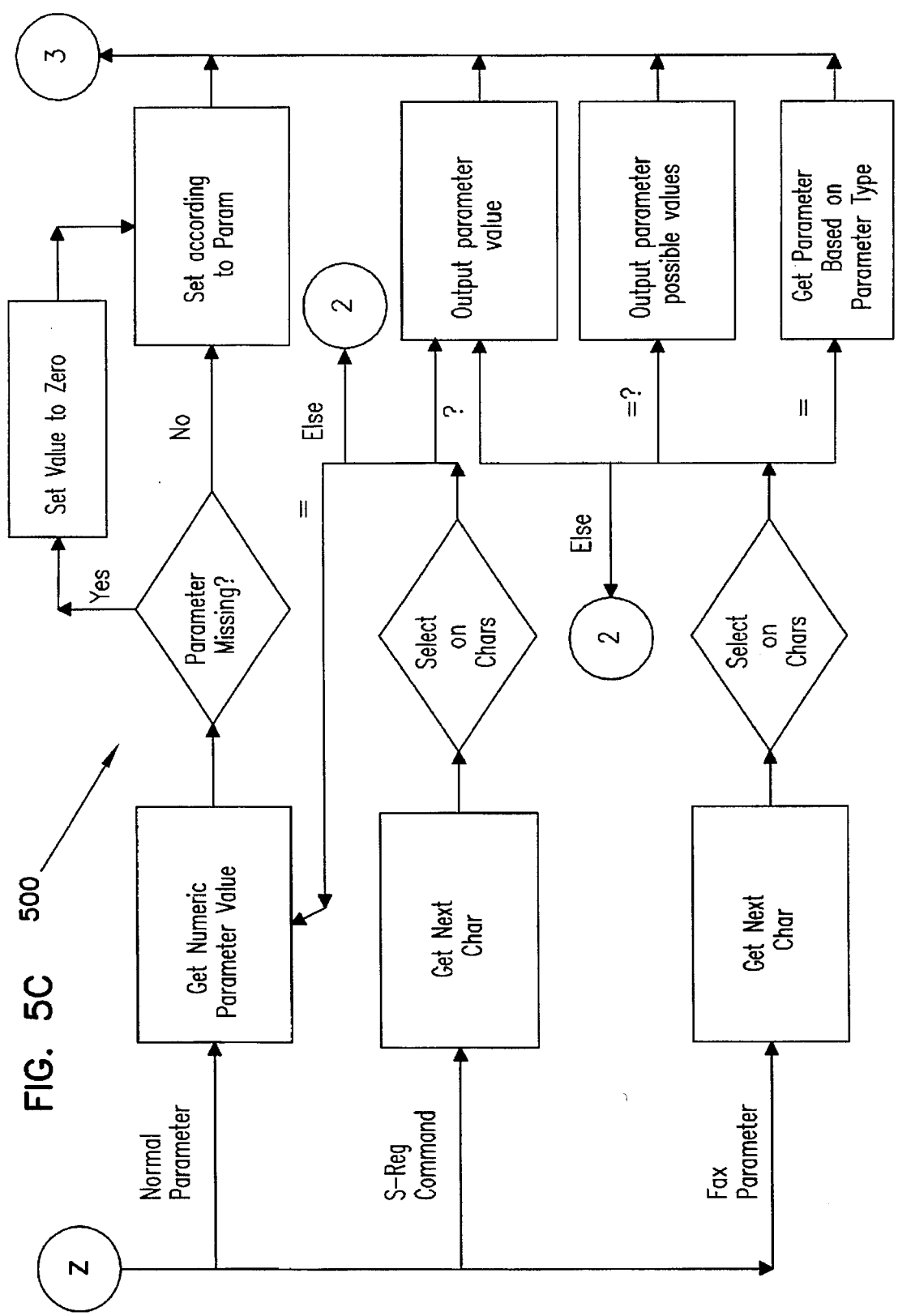

After a command has been accepted, it is processed. This processing is detailed in the Process Command Line Flowchart set forth as FIGS. 5A–5C and designated generally at 500. The process begins at block 501. The processing of the command lines can result in information being sent back to the COMMAPP in the form of command queries and "OK" or "ERROR" responses. Additionally, the command line processor detects if the actual initiated a dial or answer and returns the result to the Virtual modem state machine—which changes state based on the returned value.

The process command line is processed by processing the characters from left to right. A legal command line is one or more parameter value sets or queries, dial commands, answer commands, and dialing digits. The syntax for a command line is given below (in pseudo BNF) in Table 1.

TABLE 1

Command Line = [Dial Command|Answer Command|
Dial Digit|Parameter Set|Parameter Query|Parameter Capability Query]*

| | | | |
|---|---|---|---|
| Dial Command = | ['D'] | | |
| Answer Command = | ['A'] | | |
| Dial Digit = | [0|1|2|3|4|5|6|7|8|9|0|@|;|,|-|!|W|P|T|] | | |
| Parameter Set = | [Param_Name<Param Value> | \| | //EO |
| | 'S' SReg_Number '=' <Param Value> | \| | //SO=2 |
| | Fax_Param_Name '=' Param_Value | ] | //FCLASS=2 |
| Parameter Query = | ['S' SReg_Number '?' | \| | //SO? |
| | Fax_Param_Name '?' | ] | //+FCLASS? |
| Parameter Capability Query = | [Fax_Param_Name '=?'] | | //+FCLASS=? |
| Param_Name = | [[A-Za-z]*] | | //E |
| Fax_Param_Name = | ['+F'[A-Za-z]*] | | //+FCLASS |

*Means one or more of
< >Means optional

It will be appreciated that the commands are processed one at a time. First the name is found (or not found) and then the operation is done on that parameter. The operation includes setting or querying. If an invalid command is found in the middle of a command line, the previous parameter(s) still takes effect (i.e., the parameters before the invalid one are still modified or queried). The command line processor returns to its caller what type of command line it was in accordance with the following Table 2.

TABLE 2

| | |
|---|---|
| Done | if a normal command line |
| Dial | if the command line contained a dial command |
| Answer | if the command line contained an answer command |

Each virtual modem has a transmit and receive queue buffer associated with it. Data received from the COMM port hardware is placed in the appropriate buffer. Similarly data received from the COMMAPP is placed in the appropriate buffer. When changing between the associated buffers, pointers are changed in the VMS driver at the times designated in the physical port diagram. In addition to changing the pointers, the status and control functions are mapped.

It will be appreciated by those skilled in the art that it may be possible to provide for more than one master modem. By way of example, this application would be useful for a voice mail system so that when a person is getting their messages, outside callers can still leave a message using the free modem. Furthers, this arrangement would provide for the master application still being able to route incoming calls from either port to the appropriate application. Still further, another embodiment includes having the VMS driver connect to modems across the network (i.e., NCSI shared modems). This type of arrangement would be useful to allow communications applications to use modems that are shared among network users without having to change programs or without the users being aware of the fact that they are not using local modems, but one across the network. Inbound routing of shared network modems may be done by communicating between virtual modem drivers and several machines to determine which is available to take an incoming call.

IN OPERATION

In order to better describe the operation of the present invention, three working examples will be presented in connection with FIGS. 3A-3C and 4A-4D. The first example utilizes the situation of when the Master application is closed. The second example utilizes the situation of when the Master application is open. The last example illustrates how the present invention may be used in connection with voice over data applications. Each of these examples will be discussed in turn below.

EXAMPLE 1

For the first example, it will be assumed that the Master application is closed and that the COMMAPP is a facsimile program for windows running on port number 3 (e.g., COMMPORT number 3 is designated as a virtual modem). An example of a facsimile program for Windows is manufactured by Multi-Tech Systems, Inc. of Mounds View, Minn. and sold under the designation MultiExpress Fax for Windows. As used herein, the facsimile program will be referred to as the "FAXAPP." In this event, the logical port state machine for port number 3 starts at status block 201. When FAXAPP is launched it does a "port open" which moves it to status block 207. While moving to status block 207, the virtual modem is initialized. When FAXAPP goes to dial (e.g., to perform a fax call), it will issue "AT" commands and those commands will be routed, to direct the characters to the virtual modem. The virtual modem emulates the actual modem, and transmits back any responses to the FAXAPP program.

When FAXAPP does an ATDT (e.g., a dial command), then the first required action is to lock the port. To do so two transitions occur. The first is an ATDT/ATA lock pass which places the virtual modem at logical port state 209 or an ATDT/ATA lock fail which places the virtual modem at logical port state at 207. It will be appreciated that a lock fail sends a busy response to the FAXAPP, while a lock pass starts the actual modem initialization. During the actual modem initialization, the information which initialized the virtual modem must be used to configure the actual modem.

Accordingly, turning now to the physical port state machine of FIGS. 4A-4D, concurrently at the time that the ATDT was performed, an event was sent to the physical port state machine to flush the physical port and start performing the initialization. Those skilled in the art will appreciate that the physical port is "flushed" to eliminate any data that is located in the port. This occurs when moving from port state 102 to port state 103.

It will be appreciated that there are several events that can happen in this time period. First, if the user/operator desired to abort the fax call before the driver had initialized the actual modem to reflect the same parameters as the virtual modem (i.e., a character abort), then a "no carrier" response will be transmitted to the FAXAPP so it knows that the call was aborted. Subsequently a transition on the physical port state machine occurs back to the idle state, so as to move from port state 103 to port state 102. During the transition, it will unlock the port.

Second, it could fail to initialize the actual modem (e.g., if the modem were inadvertently turned off). In this case, if the modem is not initialized to reflect the same parameters as the virtual modem, then a "no carrier" will be issued to the FAXAPP program, the status will move from port state 103 to port state 102, and the port will be unlocked. It will be appreciated by those skilled in the art that all locks are done on the logical port and all unlocks are done on the physical port state machine.

Third, while initializing the actual modem to reflect the virtual modem parameters, a ring may come in the system. In the preferred embodiment, rings take priority and so the virtual modem queues the current call for placing at a later time. Instead the incoming call is handled. Accordingly, a "BUSY" response is sent to the FAXAPP program, and the state moves from logical port state 209 to logical port state 207. In the preferred embodiment the VMS driver does not handle any incoming calls, thus, it goes back to idle state and the modem will continue to ring, and will not be answered.

Still continuing with the Master application initially closed example. If another application is running in addition to FAXAPP and it tried to dial or FAXAPP tried to dial again, then it would get a "BUSY" response. This is similar to when it tried to do the initialization (i.e., it would get a ring and would go back to blocks 102 and 207). In this situation, the calls keep failing and the call would never be answered until the ringing stopped.

Having described the instances in which connections cannot be made, next the case in which connections are made and the ATDT is achieved will be described. In that case the state moves from block 209 to 210. On the physical port state machine of FIGS. 4A-4D, the "INIT done" message is received and actions "B" and "T" are performed to connect up the actual modem to the COMMAPP. In the present example, the FAXAPP program is thereby directly connected to the actual modem.

After the dial command has been issued and the connect detector is enabled, a routine runs in the VMS driver that detects when the actual modem has disconnected. This preserves the connect message and is passed to the application. Also, if the call fails, in the physical state port machine several actions are taken going to state 102 from 103. First, a message is sent to the VMAPP (e.g., the program which allows users to configure PARAMETERS and be notified that the modem is off, etc.). Second, the port is unlocked again.

After the application has the port locked, the physical port state moves from 103 to 104, while the logical state port machine moves to state 210. It will be appreciated by those skilled in the art that if another application is running it will be in some other state (of the logical port state machine of its own state machine).

The driver detects when the call is done, and an end of connection event is sent to both state machines. This is accomplished by the DSR signal. In the preferred embodiment, an actual modem manufactured by Multi-Tech Systems, Inc. of Mounds View, Minn. is utilized. When these modems hang up, the DSR signal goes down. Conversely, when the call is picked up the signal goes high. Accordingly, when the signal goes low, an end of connection event is sent to both state machines. This results in the link between the COMMAPP and the actual modem being broken, with the VMS driver now talking to the COMMAPP and the actual modem again. The movements associated with this action are from block 104 to 102, and from block 210 to 207. It will be appreciated by those skilled in the art that if other modems are used, then different techniques may be required to detect and determine when the modem was disconnected.

EXAMPLE 2

In the second example, a consideration of the states when the Master application is running will be presented. After Windows is loaded and the present application is launched, the driver is initialized at block 101 and moves to block 102 assuming that the actual modem could be initialized. The Master application opens and the program state moves to block 105. This movement connects the actual modem 60 to the Master application block 52. At this point, any data that is received on the port is going to be sent to the Master application. Accordingly the Master application knows the state of the actual modem.

Considering the case of FAXAPP dialing again, the same logical port sequence of events occurs. First, upon dialing, an ATDT is performed and the physical port state moves from 105 to 106. Several actions occur during this move. First, the VMS driver block 50 is hooked to the actual modem 60 because the VMS driver initializes the modem to reflect the way that the COMMAPP had initialized the virtual modem. It will be appreciated that when the COMMAPP initialized the virtual modem it set various parameters. Thus, when it goes to dial, the VMS driver must update the actual modem 60 to reflect those changes. Second, a message is sent to the Master application block 52 indicating that the COMMAPP has taken the port. Third, the physical port is flushed to make sure there is no extraneous data.

If an "init" failure occurs (e.g., the modem is off), then the physical port state moves back to state 105. On the way the Master application talks to the actual modem again, an init failure message is sent to the VMAPP, an init failure message is sent to the Master application, and the port is unlocked. If FAXAPP aborts the dial before the modem is initialized, then the actual modem is switched back to the Master application, a message is sent to the Master application to indicate that the port is being released, and the port is unlocked.

If the dial succeeds, then several tasks are performed in going from blocks 106 to 107. These tasks are similar to the ones performed in going from blocks 103 to 104. More specifically, the call application (COMMAPP) is hooked directly to the actual modem and the connect detector is enabled to collect the disconnect message when the call disconnects. At block 107, when FAXAPP finishes sending the fax, the end of connection is detected, a message is sent to the Master application indicating the COMMAPP is releasing the port, and the VMS driver switches back to the Master application. As will be appreciated, the reason that different tasks are performed at the end of the connection at blocks 107 and 104 is that the Master application is open at block 107 and was not open at block 104.

Now, assume that FAXAPP dials out and a ring comes in. During the time period when the actual modem 60 is being initialized with the VMS driver, at block 106 a message is sent to the Master application indicating the ring during the initialization. There is a transition from block 106 to 105 and the lock is switched to the Master application—because FAXAPP had a lock on the port. Accordingly, a switch occurs from the VMS driver talking to the actual modem to the Master application talking to the actual modem.

At this point, the Master application talks to the actual modem in order to determine the type of incoming call. When the Master application determines the type of call, it will initiate a generate ring command for the appropriate COMMAPP by moving to block 207 to 208. For example if the incoming call was determined to be a fax call, then the ring command would be generated to go to a FAXAPP.

The virtual modem driver 50 generates the ring and locks the port for the appropriate application. Therefore, if any other application attempts a dial a busy response will be generated. FAXAPP moves to state 208, where it keeps getting ring responses periodically (just as would occur with an actual modem receiving an incoming call).

If FAXAPP responds to that with an ATA to answer the call, the state changes from block 208 to 209. When transitioning to block 209, the initialization mode is started. There is no lock fail condition because this state cannot be achieved otherwise. More specifically, when a VMD_Master Gen Ring is issued, it is set up so that the lock is always passed. It cannot fail at this point since it is the only application which can receive the call.

After the COMMAPP moves to state 209 (which occurs after it has issued an ATA), the modem initialization starts and moves to state 106. This time it is initialized to answer. If the initialization succeeds the state moves to block 107. On the logical port state machine, the COMAPP moves to state 210 and can transmit and receive information across the actual modem in a manner well known in the art. The drop in the DSR signal indicates that the call is completed.

If the virtual modem is in state 105 when a ring comes in, the Master application detects that a ring has occurred and handles the call. First, the Master application does a lock on the port and determines what type of call is incoming. Second a gen ring command is issued to the appropriate COMMAPP. Third, if the COMMAPP responds with an ATA, then the COMMAPP gets a lock on the port, the initializations are performed and the connect is called up. It will be appreciated, however, that the Master application may not perform a gen ring in the situation where the Master application handles the call (e.g., for a voice call).

EXAMPLE 3

In the third example, assume that there are two computers (e.g. local computer 20 and remote computer 27) utilizing the Master application and a conferencing type software. As will be appreciated by those skilled in the art, this type of software is characterized by the ability to allow two people to collaborate by showing a software "white board" between two computers.

This type of program may be activated after voice communications have been established. Accordingly, the device is originally in state 105 of the physical port state machine and the Master application is open, but idle. The Master application then would lock the port, dial the modem, and allow the two modes to connect. Assuming that the conferencing software is connected to virtual modem six (COMM six best seen in FIG. 2 as one of the blocks which make up block 62), it will be appreciated that COMM six's initial state is illustrated by block 202 because it is configured as a direct port and it is closed. Accordingly, a signal is sent to the other machine to request that the conferencing software be started on the remote computer 27. A gen connect is done to COMM six in order to alert the VMS driver no to connect the conferencing software application to the actual modem when the port is opened. The logical port state for COMM six moves from block 202 to 203 once a gen connect is received. Then the software is launched after transmitting the gen connect command. Accordingly, the conferencing software will move from state 203 to state 205 as it does a port open.

In certain instances, there is a condition where the port open could fail. This may occur because of timing issues. However, generally, the lock will pass and state 205 is accomplished. On the physical port machine a direct open event is sent which moves the port from state 105 to 107. Several tasks are performed including indicating to the Master application that a COMMAPP is taking the port and that the end of connect detector should not collect the disconnect message (i.e., since it is a direct connect, a response such as no carrier is not expected). In this instance the actual modem is not visible to the application, and so if the actual modem gets disconnected in the middle of the session, the COMMAPP should not see the disconnect message. From state 105, the COMMAPP moves to state 107 where the COMMAPP is able to talk directly to the actual modem 60.

When the user is done running the conferencing software, the COMMAPP is quit and the logical port moves from state 205 to state 203 where a port close occurs. This sends a physical port close event. Accordingly, on the physical port the state moves from block 107 to block 105. However, care must be taken to avoid unlocking the port since the actual modem connection is still in progress. Therefore, the port lock is switched back to the Master application in order to maintain a lock. It will be appreciated that any time that the actual modem is off hook, the modem port should be locked. Additionally, a message is sent to the Master application indicating that the conferencing software has closed and has released the port. Accordingly, the Master application is talking to the actual modem and the conferencing software could be run once again.

In the event that a break in the connection is desired, a stop connect command can be issued. This sends a physical port direct close event, and the states are transferred as described above on the physical port machine, so that the Master application is talking to the actual modem, but anything that was sent by the conferencing software is ignored.

If an actual modem disconnect occurs in the middle of a session of the conferencing software, the end of connect detector which is running will not allow the disconnect message to be passed to the COMMAPP (i.e., the no carrier response). The code will automatically switch the port back by generating a direct close event, which will switch the lock to the Master application.

Another possibility occurs when the conferencing software is already running and a direct connect on it is desired. In this case, if the software is running it is in state 204—because it already did a port open and then when the Master application provided a gen connect it would go to block 205. Accordingly, in this situation, instead of going to blocks 202, 203, and 205, it would go to blocks 202, 204, and 205.

It will be appreciated that the above described logic flow and data structures may take on any number of configurations and operational characteristics, as are well known in the industry. Further, it is to be understood that even though numerous characteristics and advantages of the present invention have been set forth in the foregoing description, together with details of the structure and function of the invention, the disclosure is illustrative only and changes may be made in detail, especially in matters of the location of the various data files and the data structures. Further, other modifications and alterations are well within the knowledge of those skilled in the art and are to be included within the broad scope of the appended claims.

APPENDIX

| VMD API Function Calls (VMAPP calls to the VMD) | |
| --- | --- |
| Prototype: | void FAR PASCAL vmd_SetVMAppHWnd(HWND hWnd); // The VM App window handle |

Description: This function tells the driver the window handle of the VM Application. This application has the responsibility of running timers for the driver and letting the driver know when they expire. NOTE: This should be called in the WM_CREATE of the VM App and should be the first API function called.

Prototype: void FAR PASCAL vmd_PeriodicTimer( );

Description: This function should be called periodically on a 100 ms timer.

Prototype: void FAR PASCAL vmd_TimerExpired(int TimerID);

Description: This function should be called when a driver timer has expired. Driver timers are started by the driver sending a COMM_NOTIFY message to the VM App with an ID for the timer as a parameter. When it goes off the driver should be called and the timer killed.

| VMD API Function Calls (Master application calls to the VMD) | |
| --- | --- |
| Prototype: | void FAR PASCAL vmd_MasterOpen(HWND hWnd); // Window handle for Master application |

Description: This function should be called after the Master application opens the comm port that the actual modem is connected to.

Prototype: void FAR PASCAL vmd_MasterClose( );

Description: This function should be called just before the application closes the comm port that the actual modem is connected to.

Prototype: void FAR PASCAL vmd_MasterAlive( );

Description: This function should be called every two seconds by the master application after a MasterOpen as been done but before a MasterClose has been done. This lets the driver know that the master application has not crashed.

| Prototype: | int FAR PASCAL obtained, == 0 if not vmd_MasterLock( ); | // != 0 if lock |
| --- | --- | --- |

Description: This function should be called before the master application tries to send any data to the modem. If the lock succeeds then the Master application can send data to the modem, otherwise it will have to wait until the other COMMAPP, which has port, releases it.

| Prototype: | int FAR PASCAL successful, == 0 if someone else vmd_MasterUnlock( ); (ie. its not ours to unlock) | // != 0 if unlock<br>// has it locked |
| --- | --- | --- |

Description: This function should be called after the Master application completes an operation that puts the modem off-hook (so that the modem is on-hook before the unlock is done), or after some logical operation is completed (such as playing a voice file through the modem ).

| Prototype: | void FAR PASCAL<br>vmd_GenerateRing(int CommPort);<br>// Comm Port to start ringing on |
|---|---|

Description: This function allows the master modem to get an application to answer an incoming call. It sends ring messages to the modem so that it will answer the call by doing an ATA or an implied ATA via the S0 register. NOTE: This function should be called only after a MasterLock has been done. And only on a port configured to be a virtual modem.

Messages: AppGrabPort—Sent when application does an ATA.

| Prototype: | int FAR PASCAL  // != 0 if<br>successful, == 0 if app already did ATA<br>vmd_StopRing(int CommPort);<br>// Comm Port to stop ringing on |
|---|---|

Description: This function allows the Master application to stop ringing an application (e.g., if the application is taking too long to issue an ATA). NOTE: This function should only be called after a GenerateRing has been done and only on that port.

| Prototype: | void FAR PASCAL<br>vmd_GenerateConnect(int CommPort);<br>// Comm port to generate connect on |
|---|---|

Description: This function allows the master modem to connect the port to an application that is expecting a direct connect line. NOTE: This function should only be called after a MasterLock has been done, the modem is connected to a remote modem, and the port is configured to be a virtual direct connect port.

Messages: vmd_cAppGrabPort—Sent when application does an Open.

| Prototype: | void FAR PASCAL<br>vmd_StopConnect(int CommPort);<br>// Comm port to generate connect on |
|---|---|

Description: This function allows the master modem to stop direct connecting an application. NOTE: This function should only be called after a GenerateConnect has been done.

| Prototype: | int FAR PASCAL  // ! = 0 if<br>success, == 0 if port not closed<br>vmd_SetPortConfig(int CommPort,<br>// Comm port to set config of int PortType);<br>// vmd_cNormal, vmd_cVirtualModem,<br>// vmd_cVirtualDirect Connect |
|---|---|

Description: This call configures a port as either a normal port (as it would be if the standard windows comm driver was installed), a virtual modem or as a virtual direct connect port. NOTE: the port must be closed for this to succeed.

| Prototype: | int FAR PASCAL  // vmd_cNormal,<br>vmd_cVirtualModem<br>// vmd_cVirtualDirectConnect<br>vmd_GetPortConfig(int CommPort);<br>// Comm port to get config for |
|---|---|

Description: This call gets the port's current configuration setting.

| Prototype: | int FAR PASCAL  // == 0 if<br>success, != 0 if error code<br>vmd_SavePortConfigs( ); |
|---|---|

Description: This call saves the current port settings to the VMD.INI file

VMD API messages overview

The driver communicates with applications by posting WM_COMMNOTIFY messages. They can be distinguished from WM_COMMNOTIFY messages by checking if the wParam >=100.

| VMD API messages (sent from the VMD to the VMAPP) | |
|---|---|
| Message: | StartTimer - Value (100) |
| Description: | This message directs the VMAPP to start a timer. |
| Parameters: | LOWORD(lParam) = uCommPort  // the comm port of the app grabbing<br>HIWORD(lParam) = None  // the port |
| Lock State: | Does not apply |
| Message: | StopTimer - Value (101) |
| Description: | This message directs the VMAPP to stop a timer. |
| Parameters: | LOWORD(lParam) = uCommPort  // the comm port of the app grabbing<br>HIWORD(lParam) = None  // the port |
| Lock State: | Does not apply |
| Message: | InitFailure - Value (112) |

Description: This message tells the VMAPP and the Master application that the driver was unable to initialize the actual modem during an attempt to dial or answer with the modem.

| Parameters: | LOWORD(lParam) = uCommPort  // the comm port of the app that had the<br>HIWORD(lParam) = None  // init failure |
|---|---|

Lock State: The port is unlocked

VMD API messages (sent from the VMD to the Master application)

Message: AppGrabPort—Value (110)

Description: This message says that an application has grabbed the port in an attempt to dial or answer.

| Parameters: | LOWORD(lParam) = uCommPort  // the comm port of the app grabbing<br>HIWORD(lParam) = None  // the port |
|---|---|

Lock State: Port is locked by application

Message: AppReleasePort—Value (111)

Description: This message says that the application that had grabbed the port is releasing it because:

1) the call is done, 2) the dial was char aborted,
3) the init of the actual modem failed.

| Parameters: | LOWORD(lParam) = uCommPort | // the |
| --- | --- | --- |
| | comm port of the app releasing | |
| | HIWORD(lParam) = None | // the port |

Lock State: The port is unlocked
Message: InitFailure—Value (112)
Description: This message tells the VMAPP and the Master application that the driver was unable to initialize the actual modem during an attempt to dial or answer with the modem.

| Parameters: | LOWORD(lParam) = uCommPort | // the |
| --- | --- | --- |
| | comm port of the app that had the | |
| | HIWORD(lParam) = None | // init failure |

Lock State: The port is unlocked
Message: InitRing—Value (113)
Description: This message says that a ring came in when initializing the actual modem to dial.

| Paremeters: | LOWORD(lParam) = uCommPort | // the |
| --- | --- | --- |
| | comm port of the app that had the | |
| | HIWORD(lParam) = None | // ring during |
| | | initialization |

Lock State: Master has the port locked

What is claimed is:

1. A method of connecting a plurality of communication applications with an actual communication port connected to a single modem, wherein each communication application communicates with the actual communication port using an AT command set protocol, the method comprising the steps of:

(a) emulating a plurality of virtual modems in a computer memory location, each of said plurality of virtual modems for communicating with one of the plurality of communication applications;

(b) controlling said plurality of virtual modems to connect only one of the plurality of communication applications to the actual communication port at any given time;

(c) receiving and retransmitting to the actual modem AT command set-compatible initialization signals received at each of said plurality of virtual modems in order to establish proper transmission and receipt of information through each of said plurality of virtual modems to the actual modem; and (d) responding to AT command set-compatible communication signals received from each of the communication applications which are not connected to the actual communication port with appropriate modem responses to the communication signals to maintain communication with each of the non-connected communication applications such that each non-connected communication application operates as if the non-connected communication application is connected to the actual communication port.

2. The method of claim 1, further comprising the step of tracking the status of each of said virtual modems.

3. The method of claim 1, further comprising the step of establishing a plurality of buffers for storing data received from the actual modem and the communication applications.

4. The method of claim 3, wherein each of said plurality of buffers includes a transmit buffer and a receive buffer.

5. The method of claim 4, wherein said selectively connecting step includes the step of changing pointers to switch between said plurality buffers, wherein transmit and receive information is placed in buffers established for the selected communication application.

6. An apparatus for implementing a virtual modem in a computer environment in which a plurality of communication applications utilize a communication driver when talking to an actual modem connected to the computer, wherein each communication application communicates with the actual modem using an AT command set protocol, the apparatus comprising:

(a) memory means for storing a driver program for emulating a plurality of virtual modems, each of said plurality of virtual modems for communicating with one of the plurality of communication applications;

(b) means for controlling said plurality of virtual modems to connect only one of the plurality of communication applications to the actual modem at any given time;

(c) means for receiving AT command set-compatible initialization information from the plurality of communication applications and transmitting the received initialization information to the actual modem, whereby the actual modem is properly initialized to establish communication; and (d) means for responding to AT command set-compatible communication signals received from each of the communication applications which are not connected to the actual modem with appropriate modem responses to the communication signals to maintain communication with each of the non-connected communication applications such that each non-connected communication application operates as if the non-connected communication application is connected to the actual communication port.

7. The apparatus of claim 6, further comprising means for tracking the status of each virtual modem.

8. The apparatus of claim 6, further comprising a memory device used for storing a plurality of buffers, wherein said buffers store data received from the actual modem and the communication applications in a queue.

9. The apparatus of claim 8, wherein each of said plurality of buffers includes a transmit and receive buffer for each virtual modem, and wherein pointers to said buffers are switched to select between selected virtual modems and communication applications, whereby transmit and receive information is placed in the proper buffer established for the selected communication application.

10. An apparatus for implementing a virtual modem in a computer environment in which a plurality of communication applications utilize a communications driver when talking to an actual modem connected to the computer, comprising:

(a) a memory device for storing a driver program for emulating a plurality of virtual modems and for storing buffers associated with said virtual modems, each of said plurality of virtual modems for communicating with one of the plurality of communication applications; and (b) a processor device for selectively directing information, which is transmitted between the actual modem and a selected communication application, to said buffer associated with said virtual modem which is connected to the selected communication application, and for maintaining communication with each non-selected communication application by returning appropriate modem responses to communication signals received from each non-selected communication application, wherein each non-selected communication application is a communication application in the plurality of communication applications which is not the selected communication application, and wherein each non-selected communication application operates as if the non-selected communication application is connected to the actual modem.

11. The apparatus of claim 10, wherein said processor device tracks the status of each virtual modem.

12. The apparatus of claim 11, wherein said plurality of buffers store data received from the actual modem and the plurality of communication application in a queue.

13. The apparatus of claim 12, wherein said plurality of buffers includes a transmit and a receive buffer associated with each virtual modem.

14. The apparatus of claim 13, wherein said processor device directs the information to said appropriate buffer by changing software pointers in said driver.

15. The method of claim 1, further comprising the step of, in response to an incoming call received at the actual communication port, determining an appropriate one of the communication applications to handle the incoming call, connecting the appropriate communication application to the actual communication port, and transmitting an incoming call signal to the appropriate communication application to emulate an incoming call such that the appropriate communication application handles the incoming call.

16. The method of claim 1, where said receiving and retransmitting step includes the steps of storing an initialization signal received from one of the plurality of communication applications, and retransmitting said received initialization signal to the actual communication port once the one of the plurality of communication applications is connected to the actual communication port.

17. A method of connecting a plurality of communication applications with an actual communication port connected to a single modem, comprising the steps of:
(a) emulating a plurality of virtual modems;
(b) mapping each communication application to one of said plurality of virtual modems; whereby each communication application is associated with a respective virtual modem;
(c) selectively connecting only one of said virtual modems at any given time to the actual communication port, to establish communication between the actual communication port and a selected communication application corresponding to said one of said virtual modems, while maintaining communication between non-selected communication applications and said respective virtual modems by returning appropriate modem responses to communication signals received from the non-selected communication applications, wherein each non-selected communication application is a communication application in the plurality of communication applications which is not the selected communication application, and wherein each non-selected communication application operates as if the non-selected communication application is connected to the actual communication port.

18. The method of claim 17, further comprising the step of receiving an initialization signal from a communication application irrespective of whether the communication application is selected; and wherein said selectively connecting step includes the step of retransmitting said initialization signal from the selected communication application to the actual communication port.

19. The method of claim 18, wherein said receiving step includes the step of returning an appropriate modem response to said initialization signal to the communication application that transmitted said initialization signal.

20. The method of claim 17, further comprising the step of returning a failed signal to a non-selected communication application when the non-selected communication application transmits a connect command to said respective virtual modem.

21. The method of claim 20, wherein said failed signal comprises a busy response.

22. The method of claim 20, wherein said connect command is selected from tube group consisting of a dial command and an answer command.

23. The method of claim 17, further comprising the steps of:
(a) receiving an incoming call from the actual communication port;
(b) establishing communication with the incoming call;
(c) determining an appropriate one of the communication applications to receive the incoming call;
(d) connecting the actual communication port to said respective virtual modem of the appropriate communication application; and
(e) transmitting an incoming call signal to the appropriate communication application to emulate an incoming call; whereby the appropriate communication application handles the incoming call.

24. The method of claim 23, wherein said incoming call signal comprises a ring command.

25. A computer-readable memory for directing a computer to implement the method of claim 17.

26. A communications driver implemented in a computer for permitting a plurality of communication applications to share an communication port connected to a single modem, the driver comprising:
(a) a plurality of software-implemented virtual modems, wherein each virtual modem communicates with an associated one of the plurality of communication applications; and
(b) means for selectively connecting only one of said virtual modems at any given time to the actual communication port, to establish communication between the actual communication port and a selected communication application corresponding to said one of said virtual modems, while maintaining communication between each non-selected communication application and said virtual modem associated with the non-selected communication application by returning appropriate modem responses to communication signals received from the non-selected communication applications, wherein each non-selected communication application is a communication application in the plurality of communication applications which is not the selected communication application, and wherein each non-selected communication application operates as if the non-selected communication application is connected to the actual communication port.

27. The driver of claim 26, further comprising means for receiving an initialization signal from a communication application irrespective of whether the communication application is selected; and wherein said means for selectively connecting retransmits said initialization signal from the selected communication application to the actual communication port.

28. The driver of claim 27, wherein said means for receiving includes returns an appropriate modem response to said initialization signal to the communication application that transmitted said initialization signal.

29. The driver of claim 26, wherein said meat for selectively connecting returns a failed signal to a non-selected communication application when the non-selected communication application transmits a connect command.

30. The driver of claim 29, wherein said failed signal comprises a busy response.

31. The driver of claim 29, wherein said connect command is selected from the group consisting of a dial command and an answer command.

32. The driver of claim 26, wherein said means for selectively connecting includes incoming call handling means for detecting an incoming call at the actual communication port, establishing communication with the incoming call, determining an appropriate one of the communication applications to receive the incoming call, connecting the actual communication port to said virtual modem associated with the appropriate communication application, and transmitting an incoming call signal to the appropriate communication application to emulate an incoming call; whereby the appropriate communication application handles the incoming call.

33. The driver of claim 32, wherein said incoming call signal comprises a ring command.

34. A method of connecting a plurality of communication applications with an actual communication port connected to a single modem, comprising the steps of:

(a) emulating a plurality of virtual modems in a computer memory location, each of said plurality of virtual modems for communicating with one of the plurality of communication applications;

(b) controlling said plurality of virtual modems to connect only one of the plurality of communication applications to the actual communication port at any given time;

(c) receiving and retransmitting to the actual modem initialization signals received at each of said plurality of virtual modems in order to establish proper transmission and receipt of information through each of said plurality of virtual modems to the actual modem;

(d) responding to communication signals received from each of the communication applications which are not connected to the actual communication port to maintain communication with each of the non-connected communication applications; and (e) in response to an incoming call received at the actual communication port:

(1) determining an appropriate one of the communication applications to handle the incoming call;

(2) connecting the appropriate communication application to the actual communication port; and (3) transmitting an incoming call signal to the appropriate communication application to emulate an incoming call such that the appropriate communication application handles the incoming call.

\* \* \* \* \*

UNITED STATES PATENT AND TRADEMARK OFFICE
CERTIFICATE OF CORRECTION

| | |
|---|---|
| PATENT NO. : | 5,628,030 |
| DATED : | May 6, 1997 |
| INVENTOR(S) : | Steven A. Tuckner |

It is certified that error appears in the above-identified patent and that said Letters Patent is hereby corrected as shown below:

Title Page, item [54], lines 1-2: "VIRTUAL MODEM DRIVER APPARATUS AND METHOD" should read --METHOD AND APPARATUS FOR CONNECTING A PLURALITY OF COMMUNICATION APPLICATIONS WITH A COMMUNICATION PORT--

Front page, item [73], line 2: "Moundsview" should read --Mounds View--

Col. 1, lines 1-2: "VIRTUAL MODEM DRIVER APPARATUS AND METHOD" should read --METHOD AND APPARATUS FOR CONNECTING A PLURALITY OF COMMUNICATION APPLICATIONS WITH A COMMUNICATION PORT--

Col. 2, line 31: "s utilized" should read --is utilized--

Col. 4, line 17: "FIG." should read --FIGS.--; line 18: "FIG." should read --FIGS.--; line 19: "FIG." should read --FIGS.--; line 63: "25" should read --28--

Col. 5, line 27-28: "COMMAPPS" should read --COMMAPPs--; line 29: "COMMAPPS" should read --COMMAPPs--; line 30: "COMMAPPS" should read --COMMAPPs--

Col. 12, line 19: "COMAPP" should read --COMMAPP--; line 57: "no to" should read --not to--

Col. 14, line 44: "as" should read --has--

UNITED STATES PATENT AND TRADEMARK OFFICE
CERTIFICATE OF CORRECTION

PATENT NO. : 5,628,030

DATED : May 6, 1997

INVENTOR(S) : Steven A. Tuckner

It is certified that error appears in the above-identified patent and that said Letters Patent is hereby corrected as shown below:

Col. 15, line 34: "Comm port" should read --COMMPORT--; line 48: "Comm port" should read --COMMPORT--; Col. 15, line 59: "Comm port" should read --COMMPORT--

Col. 16, line 5: "Comm port" should read --COMMPORT--

Col. 19, line 28, claim 16: "where" should read --wherein--

Col. 21, line 3, claim 29: "meat" should read --means--

Signed and Sealed this

Twentieth Day of January, 1998

Attest:

BRUCE LEHMAN

*Attesting Officer*     *Commissioner of Patents and Trademarks*